United States Patent
Wu et al.

(10) Patent No.: US 11,381,340 B2
(45) Date of Patent: Jul. 5, 2022

(54) DATA TRANSMISSION METHOD AND APPARATUS AND STORAGE MEDIUM

(71) Applicant: HUAWEI TECHNOLOGIES CO., LTD., Shenzhen (CN)

(72) Inventors: Yiqun Wu, Shanghai (CN); Yi Wang, Shanghai (CN); Xiuqiang Xu, Shanghai (CN); Yan Chen, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/212,263

(22) Filed: Mar. 25, 2021

(65) Prior Publication Data

US 2021/0211230 A1  Jul. 8, 2021

Related U.S. Application Data

(63) Continuation of application No. PCT/CN2019/107726, filed on Sep. 25, 2019.

(30) Foreign Application Priority Data

Sep. 26, 2018  (CN) .......................... 201811126409.2

(51) Int. Cl.
*H04L 1/00* (2006.01)
*H04L 1/04* (2006.01)

(52) U.S. Cl.
CPC .......... *H04L 1/0061* (2013.01); *H04L 1/0041* (2013.01); *H04L 1/0047* (2013.01); *H04L 1/04* (2013.01)

(58) Field of Classification Search
None
See application file for complete search history.

(56) References Cited

U.S. PATENT DOCUMENTS

| | | | |
|---|---|---|---|
| 2010/0254449 A1* | 10/2010 | Rusch-Lhwe | H03M 13/2909 375/240.02 |
| 2010/0287457 A1 | 11/2010 | Zhang et al. | |

(Continued)

FOREIGN PATENT DOCUMENTS

| | | |
|---|---|---|
| CN | 101795172 A | 8/2010 |
| CN | 102404854 A | 4/2012 |

(Continued)

OTHER PUBLICATIONS

Jean-Baptiste Yamindi et al., The approach of the New Downlink Control Information Design for Transmission Mode 10. 2013 Wireless Telecommunications Symposium (WTS), Jul. 25, 2013, 7 pages.

(Continued)

*Primary Examiner* — Mujtaba M Chaudry
(74) *Attorney, Agent, or Firm* — Rimon PC

(57) ABSTRACT

Embodiments of this application provide a data transmission method and apparatus and a storage medium. The method includes: After obtaining a first identifier and a second identifier that uniquely identify a first device, the first device scrambles, by using the first identifier, checked data obtained through CRC check. After performing channel coding on to-be-transmitted data and scrambled checked data, the first device scrambles, by using the second identifier, coded data obtained through channel coding, and finally sends scrambled data. In this way, after receiving the scrambled data, a second device may perform descrambling by using the second identifier, and then perform CRC check, to determine whether the received data is correct and determine the first identifier of the first device.

19 Claims, 10 Drawing Sheets

(56) References Cited

U.S. PATENT DOCUMENTS

| | | | |
|---|---|---|---|
| 2011/0292895 A1 | 12/2011 | Wager et al. | |
| 2015/0201404 A1* | 7/2015 | Han | H04W 72/005 370/329 |
| 2015/0341865 A1* | 11/2015 | Yang | H04W 52/58 455/522 |
| 2016/0066345 A1* | 3/2016 | Sun | H04W 72/121 370/329 |
| 2018/0042009 A1* | 2/2018 | Abdel Shahid | H04W 72/121 |
| 2018/0123763 A1* | 5/2018 | Yu | H04L 5/0053 |
| 2018/0206238 A1* | 7/2018 | Wang | H04W 72/0466 |

FOREIGN PATENT DOCUMENTS

| | | |
|---|---|---|
| CN | 103002579 A | 3/2013 |
| CN | 103220802 A | 7/2013 |
| CN | 103260250 A | 8/2013 |
| CN | 103580772 A | 2/2014 |
| CN | 105637971 A | 6/2016 |
| CN | 107925509 A | 4/2018 |
| CN | 108024382 A | 5/2018 |
| CN | 108282430 A | 7/2018 |
| CN | 108307527 A | 7/2018 |
| CN | 108365848 A | 8/2018 |
| CN | 108574557 A | 9/2018 |
| EP | 2866480 A1 | 4/2015 |
| EP | 3047587 A1 | 7/2016 |
| EP | 2485560 B1 | 2/2018 |
| JP | 2016076942 A | 5/2016 |
| WO | 2015040579 A1 | 3/2015 |
| WO | 2015053698 A1 | 4/2015 |
| WO | 2015136332 A1 | 9/2015 |

OTHER PUBLICATIONS

Sharp, DMRS enhancements for UL CoMP. 3GPP TSG RAN WG1 Meeting #68, Dresden, Germany, Feb. 6-10, 2012, R1-120828, 11 pages.

TCL Communication Ltd, Considerations on Link Rate Adaptation for NOMA. 3GPP TSG RAN WG1 Meeting #93, Busan, Korea, May 21-May 25, 2018, R1-1807207, 4 pages.

Spreadtrum Communications, Considerations on NOMA procedures. 3GPP TSG RAN WG1 Meeting #93, Busan, Korea, May 21 May 25, 2018, R1-1806405, 3 pages.

Samsung, Discussion on NoMA related procedure. 3GPP TSG RAN WG1 Meeting #93, Busan, Korea, May 21 25, 2018, R1-1806753, 7 pages.

NTT Docomo, Inc., Considerations on NOMA related procedures. 3GPP TSG RAN WG1 Meeting #93, Busan, Korea, May 21 25, 2018, R1-1807075, 4 pages.

Nec, On UL grant-free. 3GPP TSG RAN WG1 Meeting #90, Prague, Czech Republic, 21st Aug. 25, 2017, R1 -1712994, 3 pages.

Sequans, UL Transmission without Grant. 3GPP Tsg Ran WG1 Meeting #90, Prague, P R. Czechia 21th Aug. 25, 2017, R1-1713302, 4 pages.

3GPP TS 38.211 V15.2.0 (Jun. 2018), 3rd Generation Partnership Project; Technical Specification Group Radio Access Network; NR; Physical channels and modulation(Release 15), 96 pages.

* cited by examiner

DATA TRANSMISSION METHOD AND APPARATUS AND STORAGE MEDIUM

CROSS-REFERENCE TO RELATED APPLICATIONS

This application is a continuation of International Application No. PCT/CN2019/107726, filed on Sep. 25, 2019, which claims priority to Chinese Patent Application No. 201811126409.2, filed on Sep. 26, 2018. The disclosures of the aforementioned applications are hereby incorporated by reference in their entireties.

TECHNICAL FIELD

This application relates to the field of communications technologies, and in particular, to a data transmission method and apparatus and a storage medium.

BACKGROUND

In massive machine type communications (mMTC) and ultra-reliable and low latency communication (URLLC) application scenarios, a grant-free (GF) transmission mechanism may be used for data transmission between a terminal device and a base station, so that a large quantity of terminal devices can access a communications network in the mMTC application scenario, and a high requirement on a transmission latency can be met in the URLLC application scenario. During GF transmission, when a quantity of terminal devices accessing a network is greater than a quantity of available time-frequency resources or reference signals, a problem of a collision or a data loss may occur between data sent by terminal devices, and the base station cannot determine the terminal devices that send the data. Therefore, how the base station identifies a terminal device in a condition of the GF transmission mechanism becomes an urgent problem to be resolved in a data transmission process.

According to a data transmission method in the prior art, in a data transmission process based on the GF transmission mechanism, a terminal device performs cyclic redundancy check (CRC) bit scrambling by using identity information of the terminal device. After detecting data, a base station performs CRC check on all terminal devices that use a same time-frequency resource, to determine whether identity information of a terminal device meets the CRC check.

However, in the data transmission method, because the base station needs to perform CRC check on all terminal devices that use a same time-frequency resource to determine a terminal device that sends data, and a sequence length of an identifier used as identity information is relatively long (for example, 16 bits), a network device easily determines incorrectly received data of a target terminal as correct data of another terminal device, leading to a high probability of a data reception error or a false alarm.

SUMMARY

Embodiments of this application provide a data transmission method and apparatus and a storage medium, to resolve problems of high detection complexity and a high probability of a data reception error or a false alarm in the prior art.

A first aspect of this application provides a data transmission method, applicable to a first device. The method includes: performing cyclic redundancy check CRC on to-be-transmitted data to obtain checked data; scrambling the checked data based on a first identifier to obtain scrambled checked data; performing channel coding on the to-be-transmitted data and the scrambled checked data to obtain coded data; scrambling the coded data based on a second identifier to obtain scrambled data, where a combination of the first identifier and the second identifier is used to identify the first device; and sending the scrambled data.

In this embodiment, the first device is identified by using a combination of the first identifier and the second identifier. Therefore, as the checked data obtained by performing CRC on the to-be-transmitted data is scrambled by using the first identifier, and the coded data is scrambled by using the second identifier, detection complexity is reduced, and a probability of a data reception error or a false alarm is reduced, because a second device can determine the identifier of the first device that sends the data, without performing descrambling by using identifiers of all first devices that use a same time-frequency resource.

Optionally, in a possible implementation of the first aspect, the method further includes: receiving configuration information from a second device, where the configuration information includes the first identifier.

Optionally, the configuration information further includes the second identifier.

Optionally, the second identifier is obtained from a cell-specific configuration message or a user group-specific configuration message from the second device.

The second identifier is sent by using the cell-specific configuration message or the user group-specific configuration message. For resource configuration information shared by all first devices, a quantity of times of repeated sending can be reduced, overheads of the configuration information can be reduced, and signaling overheads of downlink control information can be reduced.

Optionally, in another possible implementation of the first aspect, the configuration information further includes transmission parameter configuration information corresponding to the second identifier, and the transmission parameter configuration information includes configuration information of a time-frequency resource and/or configuration information of a reference signal; and correspondingly, the sending the scrambled data includes: sending the scrambled data based on the transmission parameter configuration information corresponding to the second identifier.

Optionally, in still another possible implementation of the first aspect, the sending the scrambled data includes: determining, based on the second identifier and a preset correspondence, transmission parameter configuration information corresponding to the second identifier, where the correspondence is a correspondence between the identifier used to scramble the coded data and the transmission parameter configuration information, and the transmission parameter configuration information includes configuration information of a time-frequency resource and/or configuration information of a reference signal; and sending the scrambled data based on the transmission parameter configuration information corresponding to the second identifier.

Optionally, in yet another possible implementation of the first aspect, the configuration information further includes transmission parameter configuration information, and the transmission parameter configuration information includes configuration information of a time-frequency resource and/or configuration information of a reference signal; and correspondingly, the method further includes: determining the second identifier based on the transmission parameter configuration information; and the sending the scrambled data includes: sending the scrambled data based on the transmission parameter configuration information.

In this embodiment, the first device may determine the second identifier based on the transmission parameter configuration information in the configuration information, and the second device does not need to directly allocate the second identifier to the first device, thereby reducing signaling overheads of the first device and the second device.

Optionally, the transmission parameter configuration information in the configuration information is obtained from a cell-specific configuration message or a user group-specific configuration message.

Optionally, in yet another possible implementation of the first aspect, the scrambling the checked data based on a first identifier to obtain scrambled checked data includes: generating a scrambling sequence based on the first identifier, where a length of the scrambling sequence is greater than a sequence length of the first identifier; and scrambling the checked data by using the scrambling sequence to obtain scrambled checked data.

In this embodiment, when the checked data is scrambled, the scrambling sequence is first generated based on the first identifier. The length of the scrambling sequence is greater than the sequence length of the first identifier. Then the checked data is scrambled by using the scrambling sequence, to obtain the scrambled checked data. The technical solution further reduces a probability of a false alarm that may occur during data transmission.

A second aspect of this application provides a data transmission method, applicable to a second device. The method includes: receiving transmitted data from a first device; descrambling the transmitted data based on a second identifier to obtain descrambled transmitted data; performing channel decoding on the descrambled transmitted data to obtain decoded data; performing cyclic redundancy check CRC on the decoded data to obtain checked data; and determining, based on the checked data, whether the decoded data is correct, and determining a first identifier of the first device.

Optionally, in a possible implementation of the second aspect, the method further includes: sending configuration information to the first device, where the configuration information includes the first identifier.

In this embodiment, the second device may send the configuration information to the first device to configure a GF resource for the first device. Optionally, the configuration information may include the first identifier, and the first identifier may be used to indicate a specific location of the first device.

Optionally, the configuration information further includes the second identifier.

Optionally, the second identifier in the configuration information is carried in a cell-specific configuration message or a user group-specific configuration message sent by the second device.

Optionally, in a possible implementation of the second aspect, the configuration information further includes transmission parameter configuration information corresponding to the second identifier, and the transmission parameter configuration information includes configuration information of a time-frequency resource and/or configuration information of a reference signal; and correspondingly, the receiving transmitted data from a first device includes: receiving the transmitted data based on the transmission parameter configuration information corresponding to the second identifier.

Optionally, in another possible implementation of the second aspect, the receiving transmitted data from a first device includes: determining, based on the second identifier and a preset correspondence, transmission parameter configuration information corresponding to the second identifier, where the correspondence is a correspondence between the identifier used to descramble the transmitted data and the transmission parameter configuration information, and the transmission parameter configuration information includes configuration information of a time-frequency resource and/or configuration information of a reference signal; and receiving the transmitted data based on the transmission parameter configuration information corresponding to the second identifier.

Optionally, in still another possible implementation of the second aspect, the configuration information further includes transmission parameter configuration information, and the transmission parameter configuration information includes configuration information of a time-frequency resource and/or configuration information of a reference signal; correspondingly, the method further includes: determining the second identifier based on the transmission parameter configuration information; and the receiving transmitted data from a first device includes: receiving the transmitted data based on the transmission parameter configuration information.

Optionally, the transmission parameter configuration information in the configuration information is carried in a cell-specific configuration message or a user group-specific configuration message sent by the second device.

A third aspect of the embodiments of this application provides a data transmission apparatus. The apparatus may be integrated into a first device, and the apparatus has a function of implementing behavior of the first device in the method in the first aspect. The function may be implemented by hardware, or may be implemented by hardware by executing corresponding software. The hardware or the software includes one or more modules corresponding to the foregoing function.

In a possible design, a structure of the first device includes a transceiver and a processor. The transceiver is configured to support communication between the first device and a second device. The processor controls the first device to perform the method provided in the first aspect of this application and the possible implementations. The first device may further include a memory. The memory is configured to be coupled to the processor, and the memory stores a program instruction and data for the first device.

A fourth aspect of the embodiments of this application provides a data transmission apparatus. The apparatus may be integrated into a second device, and the apparatus has a function of implementing behavior of the second device in the method in the second aspect. The function may be implemented by hardware, or may be implemented by hardware by executing corresponding software. The hardware or the software includes one or more modules corresponding to the foregoing function.

In a possible design, a structure of the second device includes a transceiver and a processor. The transceiver is configured to support communication between a first device and the second device. The processor controls the second device to perform the method provided in the second aspect of this application and the possible implementations. The second device may further include a memory. The memory is configured to be coupled to the processor, and the memory stores a program instruction and data for the second device.

A fifth aspect of the embodiments of this application provides a data transmission apparatus, including at least one processing element (or chip) configured to perform the method in the first aspect.

A sixth aspect of the embodiments of this application provides a data transmission apparatus, including at least one processing element (or chip) configured to perform the method in the second aspect.

A seventh aspect of the embodiments of this application provides a storage medium. The storage medium stores an instruction. When the instruction is run on a computer, the computer is enabled to perform the method in the first aspect.

An eighth aspect of the embodiments of this application provides a computer program product including an instruction. When the instruction is run on a computer, the computer is enabled to perform the method in the first aspect.

A ninth aspect of the embodiments of this application provides a storage medium. The storage medium stores an instruction. When the instruction is run on a computer, the computer is enabled to perform the method in the second aspect.

A tenth aspect of the embodiments of this application provides a computer program product including an instruction. When the instruction is run on a computer, the computer is enabled to perform the method in the second aspect.

According to the data transmission method provided in the embodiments of this application, after obtaining the first identifier and the second identifier that uniquely identify the first device, the first device scrambles, by using the first identifier, the checked data obtained through CRC check. After performing channel coding on the to-be-transmitted data and the scrambled checked data, the first device scrambles, by using the second identifier, the coded data obtained through channel coding, and finally sends the scrambled data. In this way, after receiving the scrambled data, the second device may correspondingly perform descrambling by using the second identifier, and then perform CRC check, to determine whether the received data is correct and determine the first identifier of the first device. The second device does not need to perform descrambling on all first devices that use a same time-frequency resource, thereby reducing detection complexity, and reducing a probability of a data reception error or a false alarm.

DESCRIPTION OF EMBODIMENTS

Figure 1:
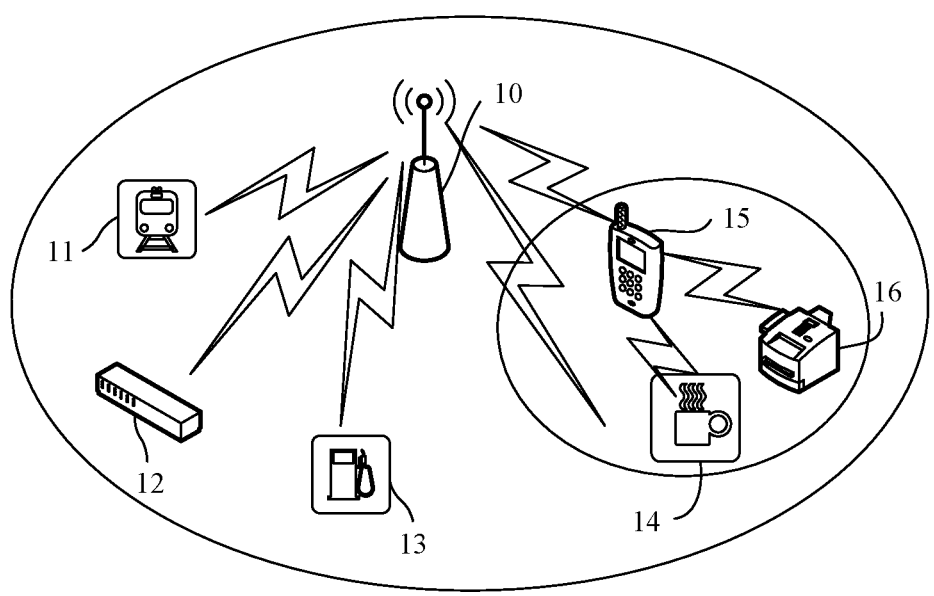
FIG. 1 is a schematic structural diagram of a communications system according to an embodiment of this application.

A data transmission method provided in the following embodiments of this application is applicable to a communications system. FIG. 1 is a schematic structural diagram of a communications system according to an embodiment of this application. As shown in FIG. 1, the communications system may include at least one network device 10 and a plurality of terminal devices located in a coverage area of the network device 10. FIG. 1 shows one network device and a terminal device 11 to a terminal device 16 for example. In the communications system in the embodiment shown in FIG. 1, the network device 10 serves as a sender and may send information to one or more of the terminal device 11 to the terminal device 16.

Optionally, in the embodiment shown in FIG. 1, the network device 10 and the terminal device 11 to the terminal device 13 may form a single-cell communications system, and the terminal device 11 to the terminal device 13 may separately or simultaneously send uplink data to the network device 10. Optionally, as shown in FIG. 1, the terminal device 14 to the terminal device 16 may form a device-to-device communications system. In the device-to-device communications system, the terminal device 15 serves as a sender and may send information to one or more of the terminal device 14 and the terminal device 16. Correspondingly, the terminal device 14 and the terminal device 16 may separately or simultaneously send data to the terminal device 15. Optionally, the communications system is not limited to including a network device and a terminal device, provided that an information sending entity and an information receiving entity exist in the communications system. This is not limited in this embodiment of this application.

Optionally, the communications system may further include other network entities such as a network controller and a mobility management entity. This embodiment of this application is not limited thereto.

The communications systems to which the embodiments of this application are applied may be a global system for mobile communications (GSM) system, a code division multiple access (CDMA) system, a wideband code division multiple access (WCDMA) system, a general packet radio service (GPRS) system, a long term evolution (LTE) system, a long term evolution-advanced (LTE-A) system, an LTE frequency division duplex (FDD) system, an LTE time division duplex (TDD) system, a universal mobile telecommunications system (UMTS), another wireless communications system that uses an orthogonal frequency division multiplexing (OFDM) technology, and the like. The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

The network device in this embodiment of this application may be configured to provide a wireless communication function for the terminal device. In other words, the network device may be a network side entity configured to send or receive a signal. The network device may include a macro base station, a micro base station (also referred to as a small cell), a relay station, an access point, and the like in various forms. In different communication modes, the network device may have different names. For example, the network device may be a base transceiver station (BTS) in GSM or CDMA, or may be a base station (nodeB, NB) in WCDMA, or may be an evolved NodeB (eNB or e-NodeB) in LTE, or may be a corresponding device gNB in a 5G network. For ease of description, in all the embodiments of this application, all of the foregoing apparatuses that provide a wireless communication function for the terminal device are referred to as network devices.

In this embodiment of this application, the terminal device may be any terminal. For example, the terminal device may be user equipment for machine type communication. In other words, the terminal device may also be referred to as user equipment (UE), a mobile station (MS), a mobile terminal, a terminal, or the like. The terminal device may communicate with one or more core networks by using a radio access network (RAN). For example, the terminal device may be a mobile phone (which is also referred to as a "cellular" phone), a computer with a mobile terminal, or the like. For example, the terminal device may alternatively be a portable, pocket-sized, handheld, computer built-in, or in-vehicle mobile apparatus, which exchanges voice and/or data with the radio access network. This is not specifically limited in this embodiment of this application.

Optionally, communication between the network device and the terminal device and between the terminal devices may use a licensed spectrum, or an unlicensed spectrum, or both a licensed spectrum and an unlicensed spectrum. The communication between the network device and the terminal device and between the terminal devices may use a spectrum below 6 gigahertz (GHz), or a spectrum above 6 GHz, or both a spectrum below 6 GHz and a spectrum above 6 GHz. A spectrum resource used between the network device and the terminal device is not limited in this embodiment of this application.

In the embodiments of this application, "a plurality of" refers to two or more than two. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects.

The following first briefly describes a scenario to which the embodiments of this application are applicable.

A wireless communications network provides a wireless communications service for a terminal device by deploying a network device. When the network device and the terminal device perform wireless communication, the network device may manage one or more cells (cell), and there may be a plurality of terminal devices in one cell. During data transmission between the network device and a terminal device in a cell, a process in which the network device sends data to the terminal device is referred to as downlink data transmission, and a process in which the terminal device sends data to the network device is referred to as uplink data transmission.

Generally, in a typical wireless communications network (for example, LTE), uplink data transmission uses a scheduling/grant-based mechanism, and the uplink data transmission is controlled by the network device. In this mechanism, the terminal device first sends an uplink scheduling request to the network device. After receiving the uplink scheduling request, the network device sends uplink grant information to the terminal device, to notify the terminal device of an uplink transmission resource allocated to the terminal device. The terminal device performs data transmission on the granted uplink transmission resource based on the uplink grant information. Therefore, the mechanism is also referred to as a grant-based (GB) mechanism.

Massive machine type communications (mMTC) is a typical application scenario of a next-generation communications network, whose typical feature is massive connections, that is, a quantity of terminal devices is huge, a service type is mainly a small data packet service, and there is a requirement on a transmission latency. When a large quantity of terminal devices access the network, if the foregoing scheduling/grant mechanism is used, on one hand, huge signaling transmission overheads are generated and scheduling pressure of the network device on resource allocation is increased, and on the other hand, a significant transmission latency is caused. In view of this, to support access of a large quantity of terminal devices, the next-generation communications network uses a grant-free (GF) transmission mechanism, or referred to as a configured-grant transmission mechanism. In grant-free transmission, once there is a data transmission requirement, the terminal device does not need to send a scheduling request to the network device for the requirement to obtain an uplink grant, but directly sends data by using a pre-allocated (or referred to as semi-statically configured) transmission resource and/or transmission parameter. In the GF transmission mechanism in which a large quantity of terminal devices access the network, because a plurality of terminal devices are allowed to perform contention-based transmission on a same time-frequency resource, a contention conflict may occur, and reduces reliability of GF transmission.

Ultra-reliable and low latency communication (URLLC) is also a typical application scenario of the next-generation communications network. For some services such as IoV, unmanned driving, and industrial control, system capacity is not a major problem, but there are high requirements on a latency and reliability. For some application scenarios in which a transmission latency is required to be less than 1 ms, the GF transmission mechanism is considered to be superior to the GB transmission mechanism, and is more suitable for uplink data transmission. Compared with the GB transmission mechanism, the GF transmission mechanism allows the terminal device to skip processes of sending an uplink scheduling request and waiting to receive a grant from the network device. This greatly shortens a transmission latency, and meets a latency requirement of the URLLC scenario.

Currently, to support the GF transmission mechanism, the network device may preconfigure, in a semi-static configuration manner, some parameters required for uplink transmission of the terminal device, for example, a location and a size of a time-frequency resource, a modulation and coding scheme (MCS), and reference signal (RS) configuration information that may be used by the terminal device. After completing the configuration, the network device attempts to detect and demodulate, at a corresponding time-frequency resource location, data sent by the terminal device. If the network device configures a different time-frequency resource for each terminal device, or different reference signals are used on a same time-frequency resource, the network device may uniquely determine identity information of UE by using a time-frequency resource and a reference signal.

In some application scenarios, when a quantity of terminal devices is greater than a quantity of available time-frequency resources or reference signals, a plurality of terminal devices may use a same time-frequency resource or reference signal to send data. In this case, a collision may occur between terminal devices and causes a data loss. In a scenario in which a collision may occur between terminal devices, when detecting data, the network device can neither determine a terminal device that sends the data, nor perform an operation such as data descrambling based on a cell radio network temporary identifier (C-RNTI) of the terminal device. In a possible implementation, the data is descrambled by using C-RNTIs of all terminal devices that use the time-frequency resource, but detection complexity is greatly increased. Therefore, how the network device identifies the terminal device in a data transmission process based on the GF transmission mechanism becomes an urgent problem to be resolved.

In the prior art, in a data transmission process based on the GF transmission mechanism, when a terminal device performs cyclic redundancy check CRC bit scrambling on to-be-transmitted data by using identity information of the terminal device, after detecting data on a time-frequency resource, the network device needs to perform CRC check on the data to determine the terminal device that sends the data. In the prior art, a sequence length of an identifier used as identity information is relatively long (for example, 16 bits). Consequently, the network device easily determines incorrectly received data of a target terminal as correct data of another terminal device, leading to a high probability of a data reception error or a false alarm.

For the foregoing problems, the embodiments of this application provide a data transmission method and apparatus and a storage medium. After obtaining a first identifier and a second identifier that uniquely identify a first device, the first device scrambles, by using the first identifier, checked data obtained through CRC check. After performing channel coding on to-be-transmitted data and scrambled checked data, the first device scrambles, by using the second identifier, coded data obtained through channel coding, and finally sends scrambled data. In this way, after receiving the scrambled data, a second device may correspondingly perform descrambling based on the first identifier and the second identifier, to obtain the to-be-transmitted data and uniquely determine the terminal device that transmits the data. The second device does not need to perform descrambling on all first devices that use a same time-frequency resource, thereby reducing detection complexity, and reducing a probability of a data reception error or a false alarm.

Specific embodiments are used below to describe in detail the technical solutions of this application. It should be noted that the following several specific embodiments may be combined with each other, and a same or similar concept or process may not be described repeatedly in some embodiments.

Figure 2:
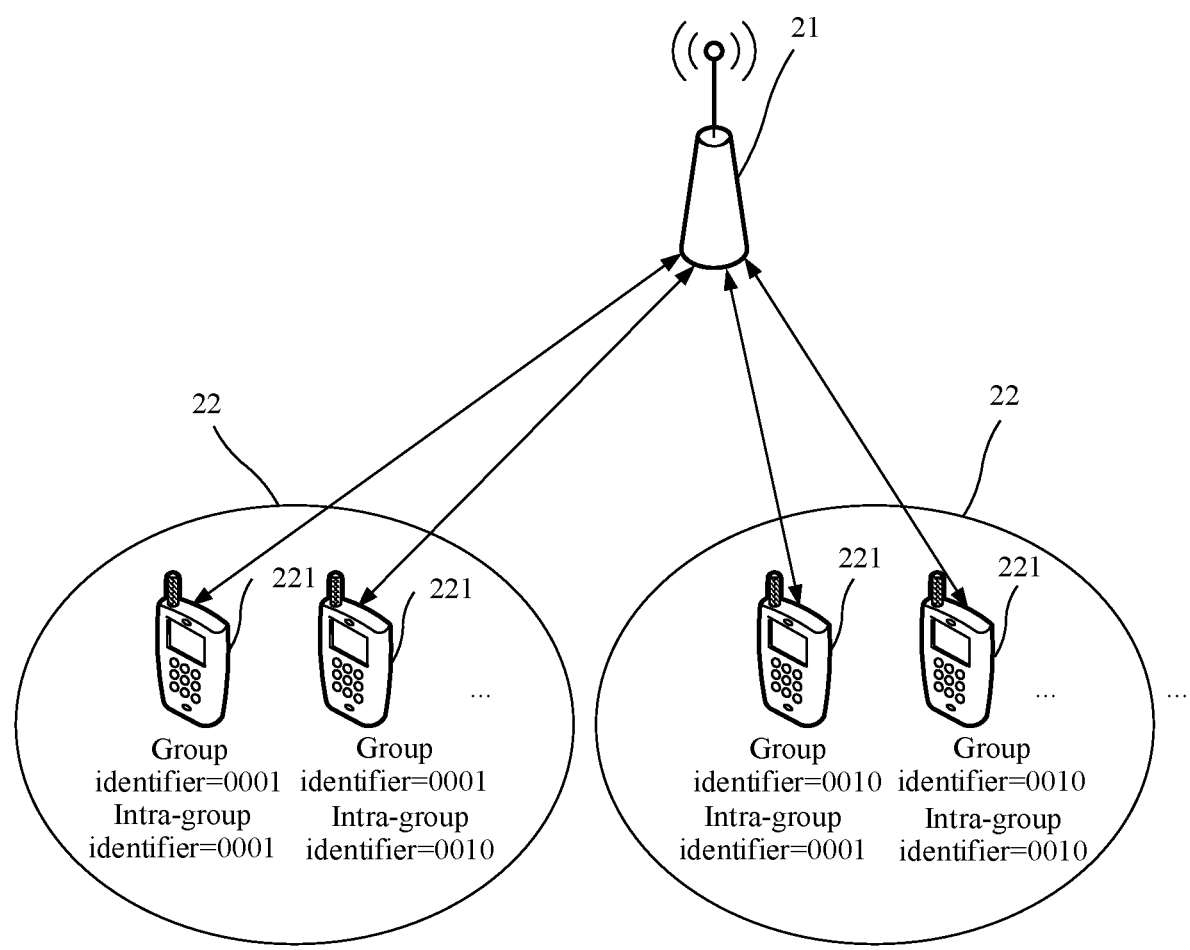
FIG. 2 is a schematic structural diagram of a communications system to which a data transmission method according to an embodiment of this application is applicable.

In the embodiments, FIG. 2 is a schematic structural diagram of a communications system to which a data transmission method according to an embodiment of this application is applicable. As shown in FIG. 2, the communications system may include a second device 21 and at least one first device group 22 that communicates with the second device 21. Each first device group 22 may include at least one first device 221. In other words, there may be one or more second device groups 22 in the communications system, and there may be one or more second devices 221 in each first device group 22. A quantity of second device groups 22 included in the communications system and a quantity of second devices 221 included in each first device group 22 are not limited in this embodiment of this application, and may be set based on an actual situation.

Optionally, in an example, the second device 21 may be a network device, and the first device 221 may be a terminal device. In this case, the data transmission method is applicable to data transmission between the network device and the terminal device. In another example, the second device 21 may be a terminal device, and the first device 221 may also be a terminal device. In this case, the data transmission method is applicable to data transmission between terminal devices. In this embodiment, for data transmission between terminal devices, the communications system may further include a network device. The network device is configured to send configuration information to the first device, to ensure data transmission between the first device and the second device in the second device group.

Figure 3:
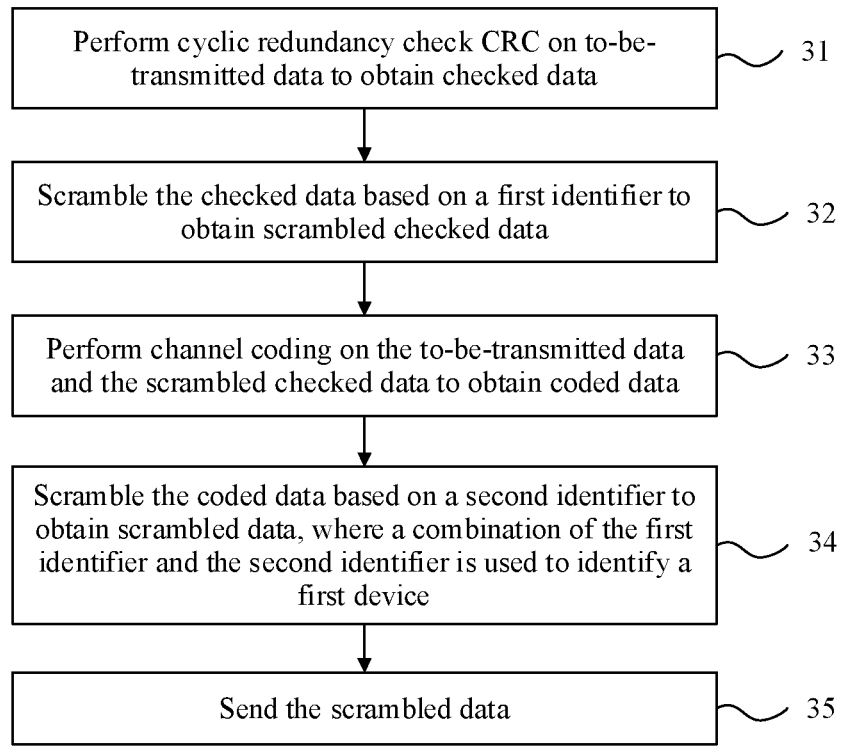
FIG. 3 is a schematic flowchart of Embodiment 1 of a data transmission method according to an embodiment of this application.

FIG. 3 is a schematic flowchart of Embodiment 1 of a data transmission method according to an embodiment of this application. The data transmission method is applicable to the communications system in the embodiment shown in FIG. 2. In the communications system, data transmission is performed between the first device and the second device. Optionally, as shown in FIG. 3, the data transmission method is applicable to the first device in the embodiment shown in FIG. 2, and the method may include the following steps.

Step 31: Perform cyclic redundancy check CRC on to-be-transmitted data to obtain checked data.

Optionally, in this embodiment of this application, when the first device has to-be-transmitted data that needs to be sent to the second device, the first device may first process the to-be-transmitted data to generate a baseband signal, and then send the baseband signal on a time-frequency resource corresponding to the first device.

Optionally, in the field of data communication, CRC is a most commonly used error check code, whose feature is that lengths of an information field and a check field may be randomly selected. Specifically, CRC is a data transmission error detection function. A transmit device performs polynomial calculation on data, and appends an obtained result to the information field, and a receive device performs a similar algorithm, to ensure correctness and integrity of data transmission.

Correspondingly, in this embodiment, when processing the to-be-transmitted data, the first device first performs cyclic redundancy check CRC on the to-be-transmitted data to obtain checked data.

For example, assuming that the to-be-transmitted data is input bits $a_0, a_1, \ldots, a_{A-1}$ whose length is A, CRC is performed on the to-be-transmitted data by using a CRC check polynomial, to obtain check bits $p_0, p_1, \ldots, p_{L-1}$ whose length is L, that is, the checked data in this embodiment.

Then the check bits $P_0, p_1, \ldots, p_{L-1}$ whose length is L are appended to the input bits to obtain information bits $b_0, b_{A+L-1}$. In this case, when $k=0, 1, \ldots, A-1$, $b_k=a_k$; when $k=A, A+1, \ldots, A+L-1$, $b_k=p_{k-A}$.

Step 32: Scramble the checked data based on a first identifier to obtain scrambled checked data.

Optionally, to enable the second device to distinguish the first device that transmits the data, in this embodiment, the obtained checked data may be scrambled by using a first identifier, to obtain scrambled checked data.

Optionally, it is assumed that the first identifier is bits $x_0, x_1, \ldots, x_{S-1}$ whose length is S, and generally $L \geq S$. Generally, the first device scrambles the last S bits in the checked data to obtain scrambled checked data. To be specific, the first device may scramble the last S bits of the information bits ($b_0, b_1, b_{A+L-1}$) by using the first identifier (the bits $x_0, x_1, \ldots, x_{S-1}$ whose length is S), to obtain scrambled information bits $c_0, c_1, \ldots, c_{A+L-1}$. Optionally, when $k=0, 1, \ldots, A+L-S-1$, $c_k=b_k$; when $k=A+L-S, \ldots, A+L-1$, $c_k=(b_k+x_{k-A+S-L})\bmod 2$.

Optionally, in this embodiment, the first identifier may be an identifier of the first device in a device group.

For example, one device group includes 16 first devices, and four bits may be used to represent an identifier of the first device. In this case, a sequence length of the first identifier is S=4. Assuming that the last four bits of the information bits are 0101, and the identifier of the first device is 0001, the last four bits of the scrambled information bits are 0100, that is, exclusive OR of 0101 and 0001.

Step 33: Perform channel coding on the to-be-transmitted data and the scrambled checked data to obtain coded data.

Optionally, in this embodiment, after the first device performs cyclic redundancy check CRC and scrambling on the to-be-transmitted data and obtains the scrambled checked data, the first device performs channel coding on the to-be-transmitted data and the scrambled checked data. The to-be-transmitted data and the scrambled checked data may form the scrambled information bits $c_0, c_1, \ldots, c_{A+L-1}$.

Therefore, in this embodiment, the first device may perform channel coding on the scrambled information bits $c_0, c_{A+L-1}$ to obtain coded data.

Step 34: Scramble the coded data based on a second identifier to obtain scrambled data, where a combination of the first identifier and the second identifier is used to identify the first device.

Optionally, in this embodiment, to ensure transmission reliability of the to-be-transmitted data, the first device may further scramble the obtained coded data by using a second identifier, to obtain scrambled data.

Optionally, in this step, a process of scrambling the coded data by using the second identifier is similar to the foregoing process of scrambling the checked data by using the first identifier.

Optionally, generally, scrambling bits may be generated by using a Gold sequence in a protocol, and the Gold sequence is initialized by using a 31-bit initial value. For general uplink data transmission, an initial value of a scrambling sequence is related to a cell identity and a terminal device identifier.

However, for a grant-free (GF) transmission mechanism, because the second device cannot learn the identifier of the first device before demodulating the data, the second device cannot descramble the received data. In this embodiment, scrambling may be performed by using an identifier (that is, a group radio network temporary identifier (G-RNTI)) of the device group to which the first device belongs.

Optionally, in this embodiment, the initial value of the scrambling sequence may be set to $c^{init}=n_{RNTI}2^{15}+n_{ID}^{cell}$, where $n_{RNTI}$ represents a sequence corresponding to the second identifier, and $n_{ID}^{cell}$ represents a sequence corresponding to a cell in which the first device is located.

Optionally, when the coded data is represented by $d_0, d_1, d_{M-1}$, where M is a bit length of the coded data, and the scrambling sequence is represented by $w_0, w_1, \ldots, w_{M-1}$, scrambled data is $\tilde{d}_0, \tilde{d}_1, \ldots, \tilde{d}_{M-1}$, where $\tilde{d}_i=(d_i+w_i) \bmod 2$.

Step 35: Send the scrambled data.

Optionally, in this embodiment, after the first device performs check, checked data scrambling, coding, and coded data scrambling on the to-be-transmitted data and obtains the scrambled data, the first device may further perform modulation and resource mapping processing on the scrambled data to obtain a baseband signal, and send the baseband signal on the time-frequency resource corresponding to the first device.

According to the data transmission method provided in this embodiment of this application, CRC is performed on the to-be-transmitted data to obtain the checked data, the checked data is scrambled based on the first identifier to obtain the scrambled checked data, channel coding is performed on the to-be-transmitted data and the scrambled checked data to obtain the coded data, the coded data is scrambled based on the second identifier to obtain the scrambled data, and the scrambled data is sent. In the technical solution, the first device is identified by using a combination of the first identifier and the second identifier. Therefore, as the checked data obtained by performing CRC on the to-be-transmitted data is scrambled by using the first identifier, and the coded data is scrambled by using the second identifier, detection complexity is reduced, and a probability of a data reception error or a false alarm is reduced, because when receiving the transmitted data, the second device can determine whether the received data is correct and determine the identifier of the first device that sends the data, without performing descrambling by using identifiers of all first devices that use a same time-frequency resource.

Optionally, in this embodiment, the first identifier and the second identifier may be obtained through configuration information. To be specific, the data transmission method may further include the following step:

receiving configuration information from the second device.

Optionally, the configuration information may include the first identifier.

In this embodiment, the second device may send the configuration information to the first device to configure a GF resource for the first device. The GF resource may include information such as a time-frequency resource, a reference signal, power control, a codebook, a sequence, and a modulation and coding scheme used by the first device to transmit data in a GF transmission mode. The configuration information may be carried in a same configuration message, or may be carried in different configuration messages. This is not limited in this application.

Optionally, the configuration information may include the first identifier. The first identifier may be used to indicate a number (or index) of the first device in the device group, and provides an implementation possibility for the first device to scramble the checked data (obtained after CRC check is performed on the to-be-transmitted data).

Figure 4:
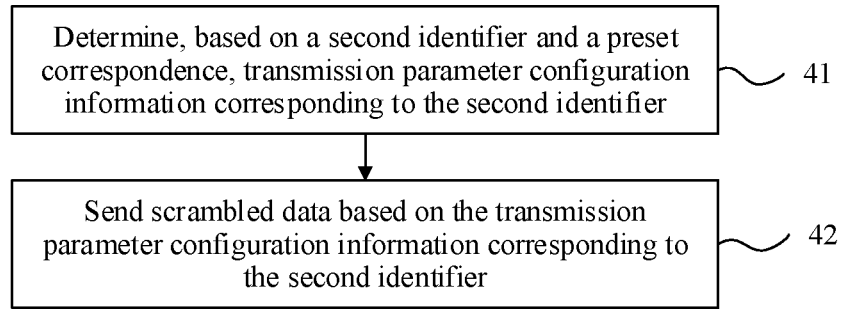
FIG. 4 is a schematic flowchart of Embodiment 2 of a data transmission method according to an embodiment of this application.

Optionally, based on the embodiment shown in FIG. 3, FIG. 4 is a schematic flowchart of Embodiment 2 of a data transmission method according to an embodiment of this application. In this embodiment, the configuration information received by the first device from the second device may further include the second identifier.

Specifically, when the second device sends configuration information to divide all first devices connected to the second device into a plurality of device groups, each device group may be allocated an identifier, that is, a group radio network temporary identifier G-RNTI. In this embodiment, the G-RNTI may be represented by the second identifier.

Therefore, in this embodiment, when the first device receives the configuration information from the second device, the first device not only can determine, based on the configuration information, the identifier (that is, the second identifier) of the device group to which the first device belongs, but also can determine, based on the configuration information, the identifier (that is, the first identifier) of the first device in the device group to which the first device belongs.

Optionally, the first identifier and the second identifier each may be a bit sequence of a specific length. Specifically, referring to the communications system shown in FIG. 2, first devices that have a same second identifier (G-RNTI) belong to a device group, the G-RNTI is an identifier of the device group, and an intra-group identifier is an identifier of a first device in the device group.

Optionally, in this embodiment, the second identifier may be obtained from a cell-specific configuration message or a user group-specific configuration message from the second device.

Figure 5A:
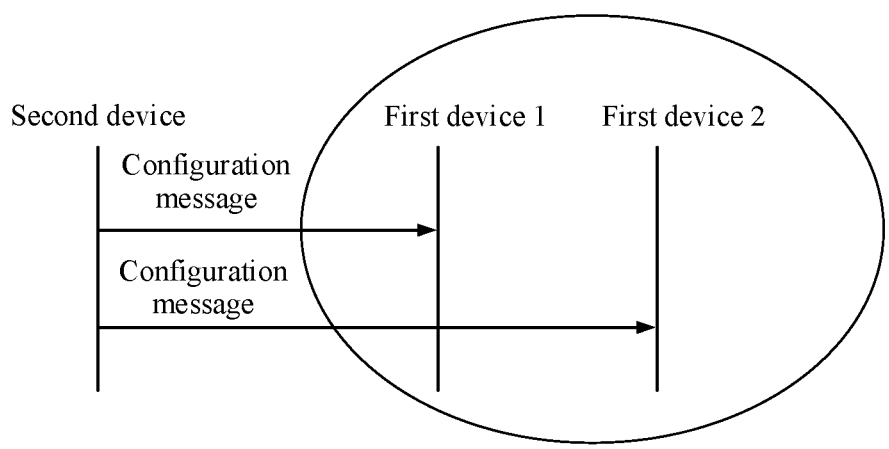
FIG. 5A is a schematic diagram showing that a second device sends configuration information to each first device in a device group corresponding to a second identifier.
Figure 5B:
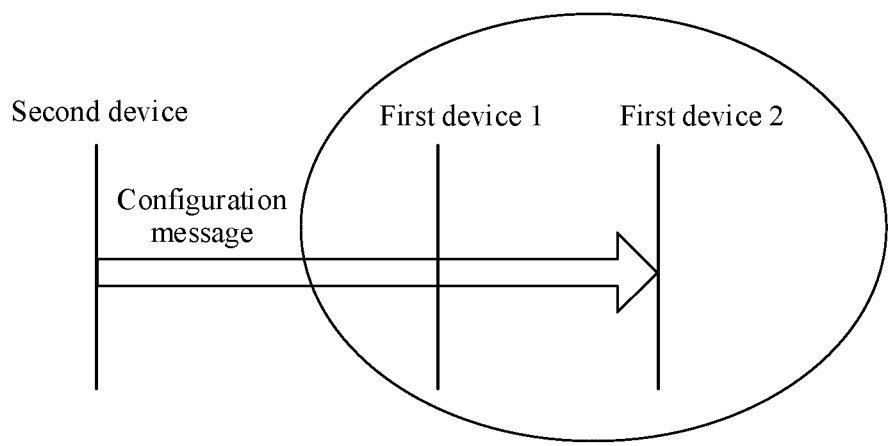
FIG. 5B is a schematic diagram showing that a second device sends configuration information to a device group corresponding to a second identifier.

Optionally, the second device sends the cell-specific configuration message or the user group-specific configuration message to the first device. The configuration message carries configuration information of transmission parameters, and the configuration information is used to configure specific values corresponding to the transmission parameters. Therefore, the first device may obtain a second identifier from the cell-specific configuration message or the user group-specific configuration message. All first devices that can correctly receive a same cell-specific configuration message or user group-specific configuration message may obtain a same second identifier. In this case, these first devices may be considered to belong to a same device group, and the second identifier may be understood as a group identifier of the group. For example, FIG. 5A is a schematic diagram showing that a second device sends a configuration message to each first device in a device group corresponding to a second identifier. FIG. 5B is a schematic diagram showing that a second device sends a configuration message to a device group corresponding to a second identifier. As shown in FIG. 5A, the second device may separately send a device-specific configuration message to each first device, to notify the first device of some transmission parameters required for data transmission. Such a method of separately sending a configuration message to each first device improves reception reliability and reception efficiency of the first device.

Optionally, as shown in FIG. 5B, the second device may alternatively send, by using a cell-specific configuration message or a user group-specific configuration message, a configuration message to the device group to which the first device belongs. In other words, each first device in the device group may receive the configuration message. Optionally, in some scenarios, the user group-specific configuration message may also be referred to as a device group-specific configuration message. This is not limited in this embodiment of this application.

Specifically, the first device in the device group may listen to control information scrambled by using the second identifier, and then demodulate a corresponding data channel based on the scrambled control information, to obtain configuration information in the data channel.

For example, for data transmission between a network device and a terminal device, a terminal device in a terminal device group may listen to downlink control information (DCI) scrambled by using an identifier of the device group, and demodulate a corresponding physical downlink shared channel (PDSCH) based on an indication of the downlink control information, to obtain configuration information in the channel. Optionally, the DCI may be a type of configuration message, and a field in the DCI is a configuration of transmission parameters, and is referred to as configuration information.

Optionally, the configuration message may alternatively be radio resource control (RRC) signaling.

Optionally, because the second identifier (G-RNTI) is an identifier of a device group, the second device may send the second identifier to the first device by using a cell-specific configuration message or a user group-specific configuration message. Therefore, the first device may obtain the second identifier from the cell-specific configuration message or the user group-specific configuration message from the second device.

Optionally, the cell-specific configuration message may be notified by the second device to first devices in a cell in a broadcast or multicast manner, so that all the first devices in the cell receive the configuration message, and then determine the second identifier and the transmission parameter configuration information. Similarly, the user group-specific configuration message may be sent by the second device to all first devices in a user group (device group) in a broadcast manner, so that all users in the user group receive the configuration message, and the second device does not need to separately send the configuration message to each first device, thereby reducing signaling overheads.

Optionally, in the method of sending configuration information by using a cell-specific configuration message or a user group-specific configuration message, for resource configuration information shared by all the first devices, a quantity of times of repeated sending can be reduced, and resource configuration information dedicated to a first device may be identified by using an intra-group ID of the first device. Optionally, overheads of sending the configuration information may be reduced by sending a cell-specific or user group-specific configuration message, and signaling overheads of the downlink control information may be reduced by sending the downlink control information by using a user group method.

Optionally, in an example, the configuration information may further include transmission parameter configuration information corresponding to the second identifier, and the transmission parameter configuration information may include configuration information of a time-frequency resource and/or configuration information of a reference signal.

Specifically, in the grant-free GF transmission mechanism, to make it convenient for the second device to receive data transmitted by the first device by using the GF transmission mechanism, an association relationship may be established between the second identifier and the transmission parameter configuration information in the configuration information. To be specific, an association relationship may be established between the second identifier and different time-frequency resources allocated to the device group corresponding to the second identifier in the configuration information. Alternatively, an association relationship may be established between the second identifier and different reference signals on a same time-frequency resource.

Figure 6A:
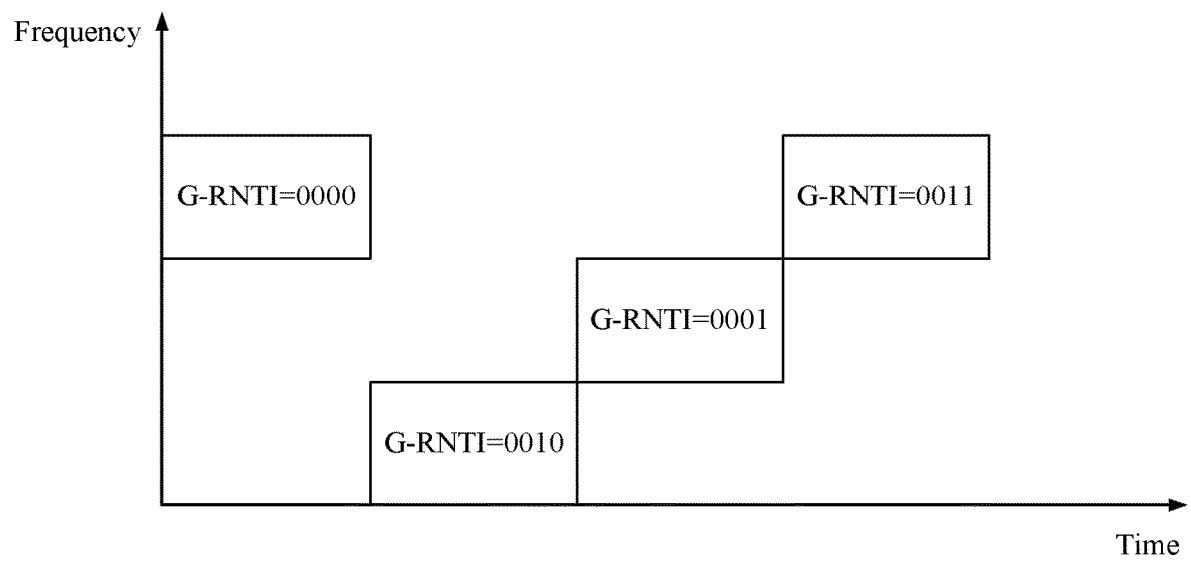
FIG. 6A is a schematic relationship diagram showing that different time-frequency resources correspond to different G-RNTIs.
Figure 6B:
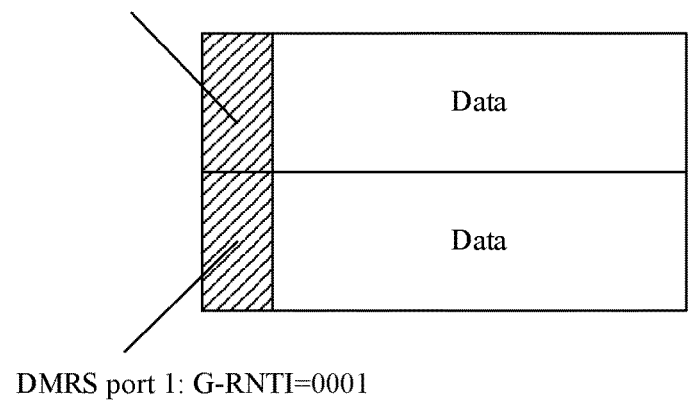
FIG. 6B is a schematic relationship diagram showing that different reference signals on a same time-frequency resource correspond to different G-RNTIs.

For example, FIG. 6A is a schematic relationship diagram showing that different time-frequency resources correspond to different G-RNTIs. FIG. 6B is a schematic relationship diagram showing that different reference signals on a same time-frequency resource correspond to different G-RNTIs. As shown in FIG. 6A and FIG. 6B, each time-frequency resource block corresponds to one G-RNTI, or each different reference signal on a same time-frequency resource block corresponds to one G-RNTI. Therefore, the configuration information received by the first device may further include the transmission parameter configuration information corresponding to the second identifier. The second identifier is a G-RNTI. Therefore, in this embodiment, the first device determines, based on the configuration information, configuration information of a time-frequency resource and/or configuration information of a reference signal used by the first device in the device group corresponding to the second identifier.

Optionally, in this embodiment, the transmission parameter configuration information may include configuration information of a time-frequency resource and/or configuration information of a reference signal. Optionally, the reference signal may be a demodulation reference signal (DMRS), a sounding reference signal (SRS), a synchronous signal (SS), a preamble, or another reference signal.

Optionally, if more than two first devices in a device group simultaneously perform grant-free GF transmission, a collision may occur. Therefore, in this embodiment, the first device may first scramble, by using the first identifier, the checked data obtained by performing CRC on the to-be-transmitted data to obtain the scrambled checked data, and then scramble, after performing channel coding on the to-be-transmitted data and the scrambled checked data and obtaining the coded data, the coded data by using the second identifier to obtain the scrambled data. In this way, the second device may uniquely determine, by using the first identifier and the second identifier, the first device that sends the to-be-transmitted data. Therefore, when more than two first devices in the device group simultaneously perform grant-free GF transmission and a collision occurs between sent data, the first device that sends the data can still be identified, thereby reducing a probability of a data reception error.

It should be noted that, in this embodiment, in addition to the first identifier, the second identifier, and the transmission parameter configuration information corresponding to the second identifier, the configuration information may further include configuration information of transmission parameters such as power control, a codebook, a sequence, and a modulation and coding scheme required by the first device for data transmission. Specific information included in the configuration information is not limited in this embodiment of this application, and may be limited based on an actual situation.

Correspondingly, step 35 (of sending the scrambled data) may be implemented in the following manner:

sending the scrambled data based on the transmission parameter configuration information corresponding to the second identifier.

Optionally, in this embodiment, because the configuration information may further include the transmission parameter configuration information corresponding to the second identifier, the first device may determine, based on the transmission parameter configuration information corresponding to the second identifier, a time-frequency resource and/or a reference signal required for data transmission, and then send the scrambled data on the time-frequency resource.

Optionally, as shown in FIG. 4, in another example, step 35 (of sending the scrambled data) may be implemented by performing the following step 41 and step 42.

Step 41: Determine, based on the second identifier and a preset correspondence, transmission parameter configuration information corresponding to the second identifier.

The correspondence is a correspondence between the identifier used to scramble the coded data and the transmission parameter configuration information, and the transmission parameter configuration information includes configuration information of a time-frequency resource and/or configuration information of a reference signal.

Optionally, in this embodiment, the first device may obtain the preset correspondence based on the configuration information, that is, obtain a preset relationship between the identifier used to scramble the coded data and the transmission parameter configuration information. Therefore, after obtaining the second identifier and the preset correspondence, the first device may determine the transmission parameter configuration information corresponding to the second identifier, that is, configuration information of a time-frequency resource and/or configuration information of a reference signal corresponding to the second identifier.

Step 42: Send the scrambled data based on the transmission parameter configuration information corresponding to the second identifier.

Optionally, after processing the to-be-transmitted data and obtaining the scrambled data, based on the configuration information of the time-frequency resource and/or the configuration information of the reference signal corresponding to the second identifier, the first device may send the scrambled data on the time-frequency resource by using the reference signal.

According to the data transmission method provided in this embodiment of this application, the first device determines, based on the second identifier and the preset correspondence, the transmission parameter configuration information corresponding to the second identifier, and then send the scrambled data based on the transmission parameter configuration information corresponding to the second identifier. In the technical solution, the scrambled data is sent based on the determined transmission parameter configuration information, thereby simplifying a subsequent process in which the second device obtains the scrambled data.

Figure 7:
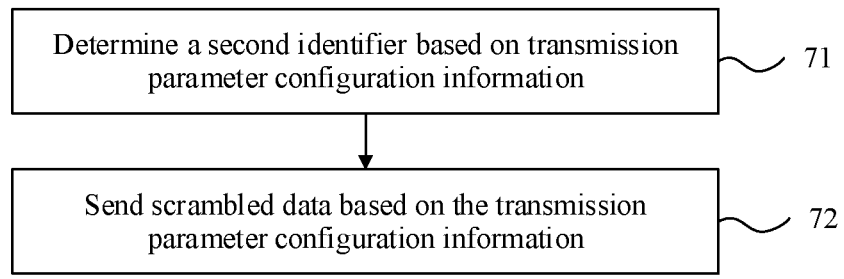
FIG. 7 is a schematic flowchart of Embodiment 3 of a data transmission method according to an embodiment of this application.

Optionally, based on the embodiment shown in FIG. 3, FIG. 7 is a schematic flowchart of Embodiment 3 of a data transmission method according to an embodiment of this application. In this embodiment, in addition to the first identifier, the configuration information further includes transmission parameter configuration information, and the transmission parameter configuration information includes configuration information of a time-frequency resource and/or configuration information of a reference signal.

Optionally, in this embodiment, when the second device sends the configuration information to the first device to configure a GF resource for the first device, the second device may further configure a piece of corresponding transmission parameter configuration information for the GF resource, and then determine, by using the transmission parameter configuration information, the identifier for data scrambling, namely, a scrambling identifier (scrambling ID, SID).

Optionally, the transmission parameter configuration information may include configuration information of a time-frequency resource, for example, a time-frequency resource identifier (resource ID, RID), a slot index, or an OFDM symbol index, or may include configuration information of a reference signal, for example, a reference signal identifier or a reference signal port index, or include configuration information of a time-frequency resource and configuration information of a reference signal.

Correspondingly, as shown in FIG. 7, the data transmission method may further include the following step.

Step 71: Determine the second identifier based on the transmission parameter configuration information.

Optionally, in this embodiment, because the transmission parameter configuration information includes the configuration information of the time-frequency resource and/or the configuration information of the reference signal, the second identifier may be determined based on a correspondence between the transmission parameter configuration information and the second identifier.

Figure 8A:
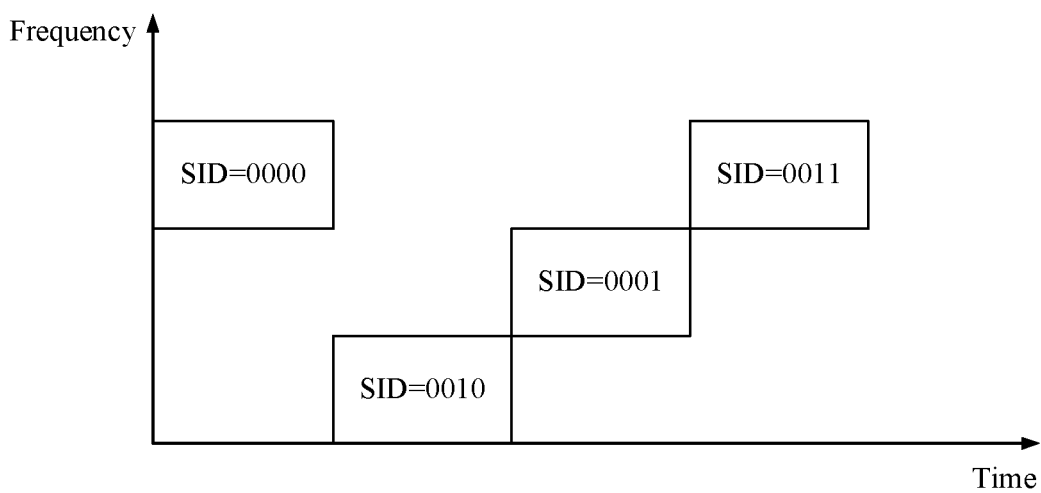
FIG. 8A is a schematic relationship diagram showing that different time-frequency resources correspond to different SIDs.
Figure 8B:
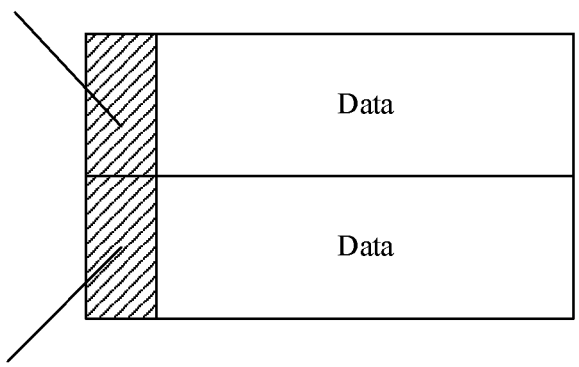
FIG. 8B is a schematic relationship diagram showing that different reference signals on a same time-frequency resource correspond to different SIDs.

For example, FIG. 8A is a schematic relationship diagram showing that different time-frequency resources correspond to different SIDs. FIG. 8B is a schematic relationship diagram showing that different reference signals on a same time-frequency resource correspond to different SIDs. As shown in FIG. 8A and FIG. 8B, each time-frequency resource block corresponds to one SID, or each different reference signal on a same time-frequency resource block corresponds to one SID. Therefore, in addition to the first identifier, the configuration information received by the first device may further include the transmission parameter configuration information, and then a SID, that is, the second identifier, may be determined based on the transmission parameter configuration information.

Optionally, similar to that in the embodiment shown in FIG. 4, the reference signal may be a DMRS, a preamble, or another reference signal.

Correspondingly, step 35 (of sending the scrambled data) may be replaced with the following step:

Step 72: Send the scrambled data based on the transmission parameter configuration information.

Optionally, in this embodiment, when the configuration information includes the transmission parameter configuration information, the configuration information of the time-frequency resource and/or the configuration information of the reference signal required for data transmission may be determined based on the transmission parameter configuration information, and then the scrambled data may be sent on the time-frequency resource by using the reference signal.

Optionally, the transmission parameter configuration information in the configuration information is obtained from a cell-specific configuration message or a user group-specific configuration message.

Optionally, for specific explanations of the cell-specific configuration message and the user-specific configuration message, refer to the description part of the schematic diagram corresponding to FIG. 5B in the embodiment corresponding to FIG. 4. Details are not described herein again.

Figure 9:
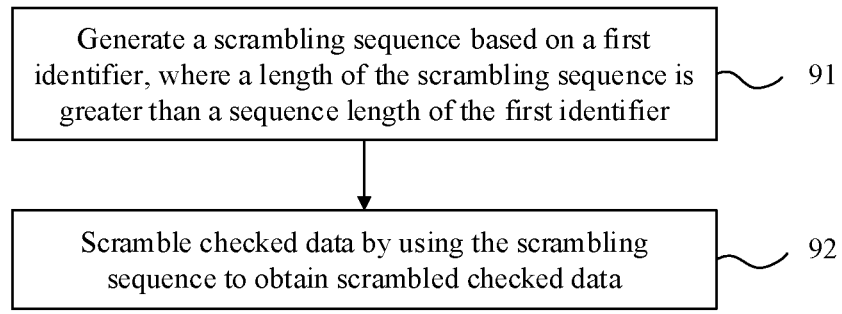
FIG. 9 is a schematic flowchart of Embodiment 4 of a data transmission method according to an embodiment of this application.

Optionally, based on the embodiment shown in FIG. 3, FIG. 9 is a schematic flowchart of Embodiment 4 of a data transmission method according to an embodiment of this application. As shown in FIG. 9, in this embodiment, step 32 (of scrambling the checked data based on a first identifier to obtain scrambled checked data) may be implemented by performing the following steps.

Step 91: Generate a scrambling sequence based on the first identifier, where a length of the scrambling sequence is greater than a sequence length of the first identifier.

Figure 10A:
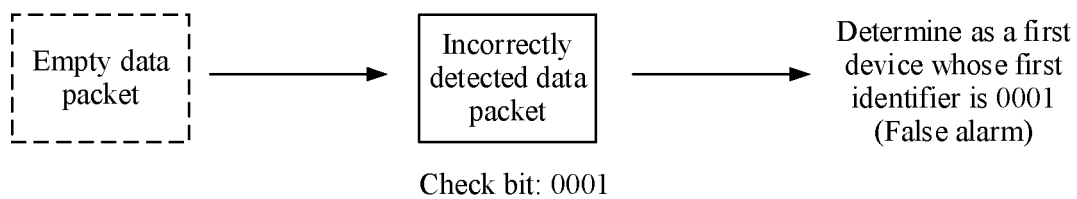
FIG. 10A and FIG. 10B are schematic diagrams of false alarms that occur when checked data is scrambled by using a first identifier according to an embodiment.
Figure 10B:
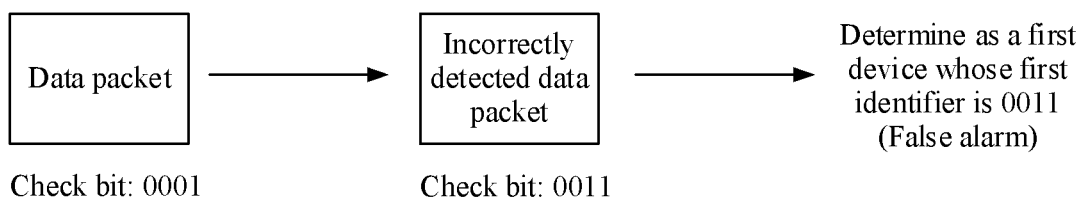

For example, FIG. 10A and FIG. 10B are schematic diagrams of false alarms that occur when checked data is scrambled by using a first identifier according to an embodiment. In a communications system, due to impact of noise, in a case, as shown in FIG. 10A, the second device may perform detection when the first device does not send a data packet. In this case, check bits 0001 may be obtained through CRC check. Therefore, the second device may determine that a first device whose first identifier is 0001 sends a data packet, which is incorrect, and leads to a false alarm. In another case, as shown in FIG. 10B, the second device performs detection when the first device sends a data packet, but the second device fails to detect the data packet. To be specific, check bits used by the first device to send the data packet are 0001, but check bits obtained by the second device through CRC check are 0011. In this case, it is determined that a first device whose first identifier is 0011 sends a data packet, which is also incorrect, and also leads to a false alarm.

Optionally, in this embodiment, to further reduce a probability of a false alarm, the first device may increase a quantity of scrambling bits. For example, if the sequence length of the first identifier is S=4, the quantity of check bits is L=24. In this case, the sequence length of the first identifier may be repeated a plurality of times to form a new scrambling sequence.

Figure 11A:
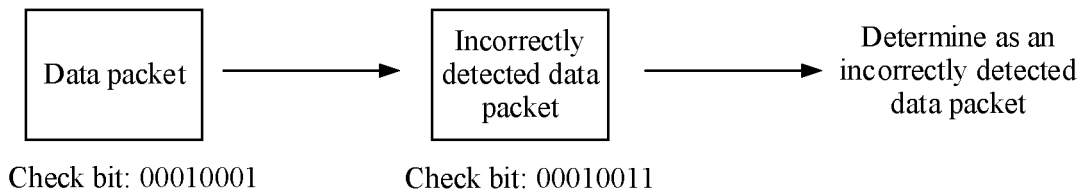
FIG. 11A and FIG. 11B are schematic diagrams of reducing false alarms by adding scrambling bit data according to an embodiment.
Figure 11B:
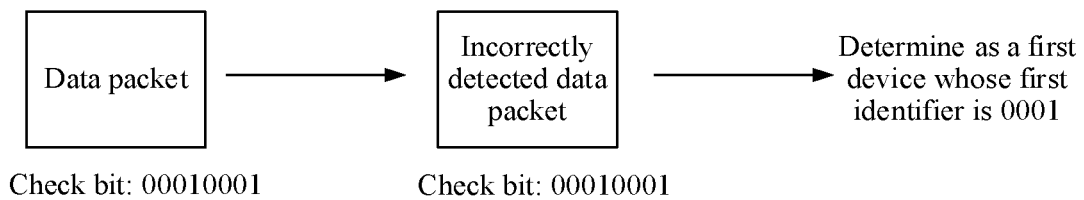

Optionally, FIG. 11A and FIG. 11B are schematic diagrams of reducing false alarms by adding scrambling bit data according to an embodiment. In the communications system, as shown in FIG. 11A and FIG. 11B, the first identifier may be repeated twice to form scrambling bits, and it is determined that reception is correct only when the first four bits and the last four bits of eight bits are completely the same. Therefore, a probability of a false alarm is much lower than that when only four check bits are used.

Specifically, in this embodiment, when the first identifier is bits $x_0, x_1, \ldots, x_{S-1}$ whose length is S, the scrambling sequence may be bits $y_0, y_1, \ldots, y_{2S-1}$ whose length is 2S. Therefore, when $k=0, 1, \ldots, S-1$, $y_k=x_k$; when $k=S, S+1, \ldots, 2S-1$, $y_k=x_{k-S}$. When the first device scrambles the last 2S bits in the checked data, when $k=0, 1, \ldots, A+L-2S-1$, a scrambled information bit $c_k$ is equal to an unscrambled information bit $b_k$, that is, $c_k=b_k$. When $k=A+L-2S, \ldots, A+L-1$, $c_k=(b_{k-A+2S-L})$mod 2.

Step 92: Scramble the checked data by using the scrambling sequence to obtain scrambled checked data.

Optionally, in this embodiment, after generating, based on the first identifier, the scrambling sequence whose sequence length is greater than the sequence length of the first identifier, the first device may scramble the checked data by using the scrambling sequence, to correspondingly obtain scrambled checked data.

Optionally, for a process in which the first device scrambles the checked data by using the scrambling sequence in this step, refer to the description in step 32 in the embodiment shown in FIG. 3. Details are not described herein again.

According to the data transmission method provided in this embodiment of this application, when the checked data is scrambled, the scrambling sequence is first generated based on the first identifier. The length of the scrambling sequence is greater than the sequence length of the first identifier. Then the checked data is scrambled by using the scrambling sequence, to obtain the scrambled checked data. The technical solution can further reduce a probability of a false alarm that may occur during data transmission.

Figure 12:
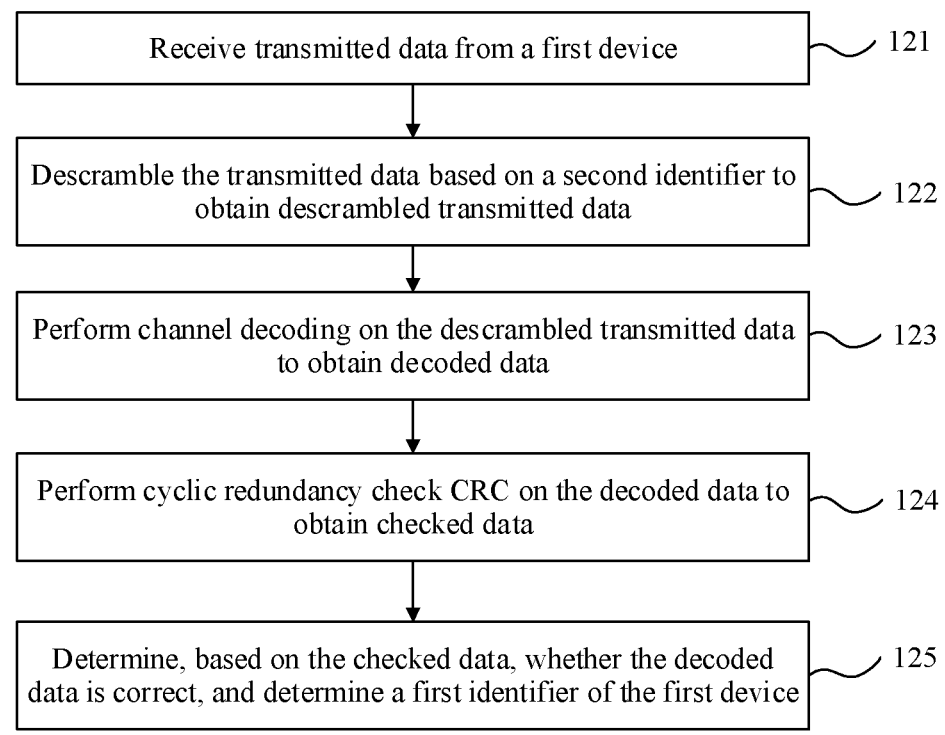
FIG. 12 is a schematic flowchart of Embodiment 5 of a data transmission method according to an embodiment of this application.

FIG. 12 is a schematic flowchart of Embodiment 5 of a data transmission method according to an embodiment of this application. The data transmission method is applicable to the second device in the embodiment shown in FIG. 2. As shown in FIG. 12, the data transmission method may include the following steps.

Step 121: Receive transmitted data from a first device.

Optionally, in this embodiment, after the first device sends the transmitted data to the second device on a determined time-frequency resource, the second device may detect the transmitted data on a corresponding time-frequency resource, to receive the transmitted data from the first device.

Optionally, the transmitted data may be sent by the first device to the second device by using a baseband signal. Therefore, after receiving the baseband signal, the second device may first perform demapping, channel estimation, and demodulation processing on the baseband signal based on an inverse process of processing to-be-transmitted data by the first device, to obtain soft information of coded data, that is, the transmitted data in this embodiment.

Optionally, the soft information is usually represented by a log likelihood ratio (log likelihood ratio, LLR), and represents a logarithm of a ratio of a probability of a bit being 0 to a probability of a bit being 1.

Step 122: Descramble the transmitted data based on a second identifier to obtain descrambled transmitted data.

Optionally, in this embodiment, inverse to a process in which the first device scrambles the coded data by using the second identifier, after obtaining the transmitted data sent by the first device, the second device may determine the second identifier based on transmission parameter configuration information (configuration information of a time-frequency resource and/or configuration information of a reference signal) used to receive the transmitted data. For example, the second identifier used to descramble the transmitted data received by using the time-frequency resource and/or the reference signal may be determined based on a correspondence between the time-frequency resource and/or the reference signal and the second identifier. The received transmitted data is descrambled based on the second identifier.

Optionally, the second device may determine the second identifier (which may be a G-RNTI, a SID, or an RID) based on a GF resource. Therefore, a scrambling sequence may be generated based on the second identifier, and then the soft information of the coded data obtained in step 121 is descrambled by using the scrambling sequence.

Optionally, when a scrambling bit that can be generated based on the second identifier is 0, a log likelihood ratio of a corresponding coded bit is maintained. When a scrambling bit that can be generated based on the second identifier is 1, negation is performed on the log-likelihood ratio of the coded bit.

Step 123: Perform channel decoding on the descrambled transmitted data to obtain decoded data.

Optionally, because channel coding processing is performed on the to-be-transmitted data and scrambled checked data by the first device, in this embodiment, the second device may perform channel decoding on the descrambled transmitted data to obtain decoded data.

Step 124: Perform cyclic redundancy check CRC on the decoded data to obtain checked data.

Optionally, in this embodiment, the second device may divide all first devices into groups, and allocate an identifier to a first device in each group. The first identifier is an identifier of the first device in a device group. Optionally, after the device group to which the first device that transmits the data belongs or the used transmission parameter configuration information is determined based on the second identifier, the second device may obtain checked data related to the first identifier when performing cyclic redundancy check CRC on the decoded data.

Optionally, in this embodiment, the second device may obtain the checked data by performing CRC on the obtained decoded data. When the second device correctly receives the data, the checked data may be the first identifier, or may be a scrambling sequence generated by the first device based on the first identifier.

A process of performing CRC check on the decoded data belongs to the prior art, and details are not described herein.

Step 125: Determine, based on the checked data, whether the decoded data is correct, and determine the first identifier of the first device.

A combination of the first identifier and the second identifier is used to identify the first device.

In an embodiment, if the first device uses the first identifier when scrambling CRC checked data, the checked data obtained by the second device in step 124 is also an identifier, and the identifier is matched against a first identifier of each first device in the first device group corresponding to the second identifier. If the matching succeeds, it indicates that the decoded data is correct, and the checked data is the first identifier of the first device that sends the transmitted data. If the matching fails, it indicates that the decoded data is incorrect. In other words, the transmitted data sent by the first device is not correctly received.

In an embodiment, if the first device scrambles the CRC checked data by using a scrambling sequence generated based on the first identifier (for example, a scrambling sequence formed by repeating the first identifier one or more times), the checked data obtained by the second device in step 124 is also a sequence whose length is the same as that of the scrambling sequence used by the transmit end to scramble the CRC checked data, and the sequence is matched against a scrambling sequence generated based on the first identifier of each first device in the first device group corresponding to the second identifier. If the matching succeeds, it indicates that the decoded data is correct. If the matching fails, it indicates that the decoded data is incorrect. In other words, the transmitted data sent by the first device is not correctly received. If the decoded data is incorrect, the first identifier of the first device is restored from the checked data based on a scrambling sequence generation rule.

Optionally, in this embodiment, after the second device performs channel decoding on the descrambled transmitted data and obtains the decoded data in step 123, and obtains the checked data in step 124, the second device may determine, based on the checked data, whether the checked data is an identifier of a first device in the device group corresponding to the second identifier or a scrambling sequence corresponding to an identifier of a first device. When the checked data is an identifier of a first device in the device group corresponding to the second identifier or a scrambling sequence corresponding to an identifier of a first device, it indicates that the obtained decoded data is correct, and the identifier of the first device corresponding to the checked data is the first identifier.

According to the data transmission method provided in this embodiment of this application, the second device receives the transmitted data from the first device, descrambles the transmitted data based on the second identifier to obtain the descrambled transmitted data, then performs channel decoding on the descrambled transmitted data to obtain the decoded data, performs cyclic redundancy check CRC on the decoded data to obtain the checked data, and finally, determines, based on the checked data, whether the decoded data is correct, and determines the first identifier of the first device. A combination of the first identifier and the second identifier is used to identify the first device. In the technical solution, the first device is identified by using a combination of the first identifier and the second identifier. Therefore, as the transmitted data is descrambled based on the second identifier to obtain the descrambled transmitted data, and the first identifier of the first device is determined based on the obtained checked data, detection complexity is reduced, and a probability of a data reception error or a false alarm is reduced, because the second device can determine the first device that sends the data, without performing descrambling by using identifiers of all first devices that use a same time-frequency resource.

Optionally, in this embodiment, the data transmission method may further include the following step:

sending configuration information to the first device, where the configuration information includes the first identifier.

In this embodiment, the second device may configure a GF resource for the first device by sending a configuration message to the first device. The configuration message includes configuration information. Optionally, the configuration information may include the first identifier, and the first identifier may be used to indicate a location of the first device.

Optionally, in a possible implementation of this embodiment of this application, the configuration information may further include the second identifier.

Optionally, the second identifier may be a group radio network temporary identifier G-RNTI, or may be a scrambling identifier SID.

Optionally, the second identifier is included in a cell-specific configuration message or a user group-specific configuration message.

In this embodiment, for descriptions of content included in the configuration information, the first identifier, and the second identifier, refer to descriptions of corresponding parts in the embodiment shown in FIG. 4. Details are not described herein again.

Optionally, the configuration information may further include transmission parameter configuration information corresponding to the second identifier, and the transmission parameter configuration information may include configuration information of a time-frequency resource and/or configuration information of a reference signal.

Correspondingly, in an example, step 121 (of receiving transmitted data from a first device) may be implemented by performing the following step:

receiving the transmitted data based on the transmission parameter configuration information corresponding to the second identifier.

Optionally, in this embodiment, when the configuration information sent by the second device to the first device includes the transmission parameter configuration information corresponding to the second identifier, the second device may learn which time-frequency resource or reference signal is used by the first device to send the data. Therefore, the second device may receive the transmitted data based on the transmission parameter configuration information corresponding to the second identifier.

Optionally, in another example, step 121 (of receiving transmitted data from a first device) may be implemented by performing the following steps.

Step A1: Determine, based on the second identifier and a preset correspondence, transmission parameter configuration information corresponding to the second identifier.

The correspondence is a correspondence between the identifier used to descramble the transmitted data and the transmission parameter configuration information, and the transmission parameter configuration information includes configuration information of a time-frequency resource and/or configuration information of a reference signal.

Optionally, in this embodiment, the configuration information implicitly includes the preset correspondence, that is, a preset relationship between the identifier used to descramble the transmitted data and the transmission parameter configuration information. Therefore, after determining the second identifier and the preset correspondence, the second device may determine the transmission parameter configuration information corresponding to the second identifier, that is, configuration information of a time-frequency resource and/or configuration information of a reference signal corresponding to the second identifier.

Step A2: Receive the transmitted data based on the transmission parameter configuration information corresponding to the second identifier.

Optionally, because the first device may send the scrambled data, that is, the transmitted data, based on the transmission parameter configuration information corresponding to the second identifier, in this embodiment, based on the configuration information of the time-frequency resource and/or the configuration information of the reference signal corresponding to the second identifier, the second device may receive the transmitted data on the time-frequency resource by using the reference signal.

Optionally, in another possible implementation of this embodiment of this application, the configuration information further includes transmission parameter configuration information, and the transmission parameter configuration information includes configuration information of a time-frequency resource and/or configuration information of a reference signal.

Correspondingly, the data transmission method may further include the following step:

determining the second identifier based on the transmission parameter configuration information.

Optionally, in this embodiment, a specific implementation of this step is similar to the step of determining, by the first device, the second identifier based on the transmission parameter configuration information. For details, refer to the description of step 71 in the embodiment shown in FIG. 7. Details are not described herein again.

Correspondingly, step 121 (of receiving transmitted data from a first device) may be replaced with the following step:

receiving the transmitted data based on the transmission parameter configuration information.

Optionally, in this embodiment of this application, when the configuration information includes the transmission parameter configuration information, configuration information of a time-frequency resource and/or configuration information of a reference signal required for data transmission may be determined based on the transmission parameter configuration information, and then the transmitted data corresponding to the reference signal may be received on the time-frequency resource.

Optionally, the transmission parameter configuration information in the configuration information is included in a cell-specific configuration message or a user group-specific configuration message of the second device.

For specific explanations of the cell-specific configuration message and the user-specific configuration message, refer to the description part of the schematic diagram corresponding to FIG. 5B in the embodiment corresponding to FIG. 4. Details are not described herein again.

Figure 13:
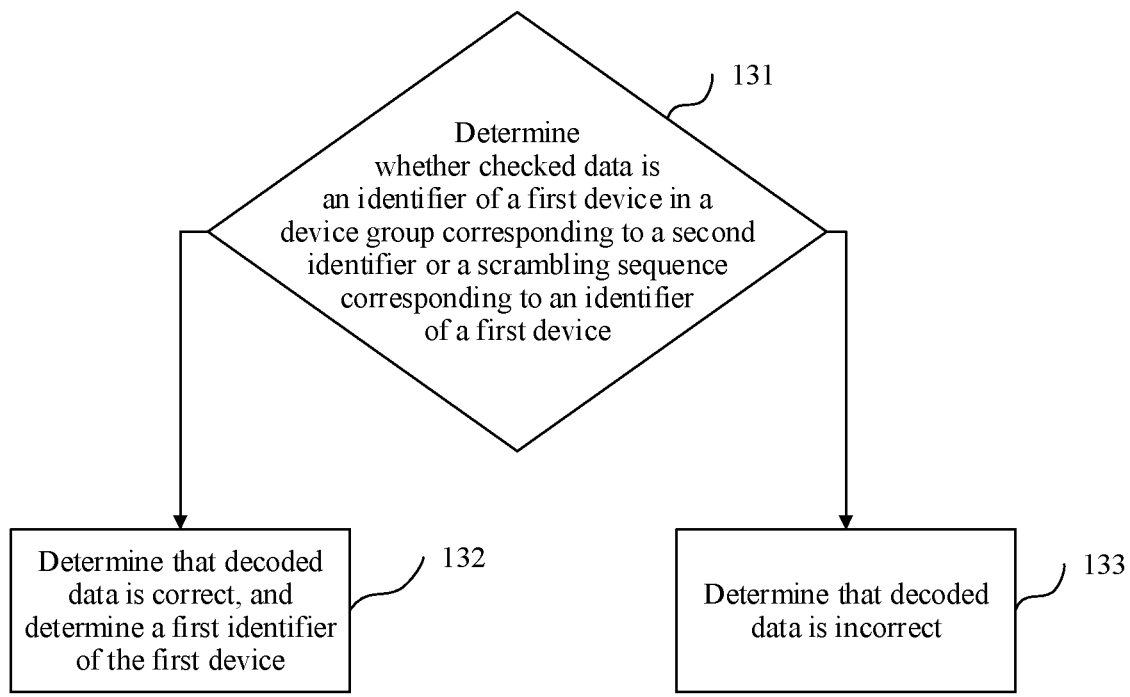
FIG. 13 is a schematic flowchart of Embodiment 6 of a data transmission method according to an embodiment of this application.

Optionally, based on the embodiment shown in FIG. 12, FIG. 13 is a schematic flowchart of Embodiment 6 of a data transmission method according to an embodiment of this application. As shown in FIG. 13, in this embodiment, step 125 (of determining, based on the checked data, whether the decoded data is correct, and determining the first identifier of the first device) may be implemented by performing the following steps.

Step 131: Determine whether the checked data is an identifier of a first device in the device group corresponding to the second identifier or a scrambling sequence corresponding to an identifier of a first device; and if the checked data is an identifier of a first device in the device group corresponding to the second identifier or a scrambling sequence corresponding to an identifier of a first device, perform step 132; otherwise, perform step 133.

Optionally, a length of the scrambling sequence is greater than a sequence length of the first identifier.

Optionally, in this embodiment of this application, after performing cyclic redundancy check CRC on the decoded data and obtaining the checked data, the second device first determines whether the checked data is an identifier of a first device in the device group corresponding to the second identifier. When the checked data is not an identifier of any first device in the device group corresponding to the second identifier, it may be further determined whether the checked data is a scrambling sequence corresponding to an identifier of a first device in the device group corresponding to the second identifier. This is because the first device may perform scrambling by using a scrambling sequence that is generated by using the first identifier and whose length is greater than the sequence length of the first identifier to further reduce a probability of a false alarm that may occur in a data transmission process.

Step 132: Determine that the decoded data is correct, and determine the first identifier of the first device.

Step 133: Determine that the decoded data is incorrect.

Optionally, in this embodiment, when the checked data is an identifier of a first device in the device group corresponding to the second identifier or a scrambling sequence corresponding to an identifier of a first device, it is determined that the data received by the second device is correct; otherwise, it is determined that the data received by the second device is incorrect.

According to the data transmission method provided in this embodiment of this application, the second device determines whether the checked data is an identifier of a first device in the device group corresponding to the second identifier or a scrambling sequence corresponding to an identifier of a first device; and if the checked data is an identifier of a first device in the device group corresponding to the second identifier or a scrambling sequence corresponding to an identifier of a first device, determines that the decoded data is correct, and determines the first identifier of the first device; otherwise, determines that the decoded data is incorrect. The technical solution reduces a probability of a false alarm that may occur during data transmission.

Figure 14:
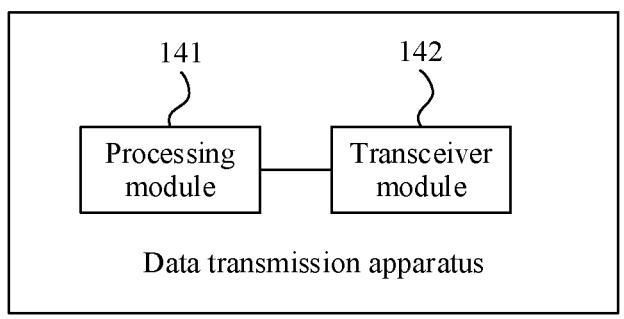
FIG. 14 is a schematic structural diagram of Embodiment 1 of a data transmission apparatus according to an embodiment of this application.

FIG. 14 is a schematic structural diagram of Embodiment 1 of a data transmission apparatus according to an embodiment of this application. The data transmission apparatus is applicable to a first device. In other words, the apparatus may be integrated into the first device, or may be the first device. For example, the first device may be a terminal device. Optionally, as shown in FIG. 14, the apparatus may include a processing module 141 and a transceiver module 142.

The processing module 141 is configured to: perform cyclic redundancy check CRC on to-be-transmitted data to obtain checked data, scramble the checked data based on a first identifier to obtain scrambled checked data, perform channel coding on the to-be-transmitted data and the scrambled checked data to obtain coded data, and scramble the coded data based on a second identifier to obtain scrambled data, where a combination of the first identifier and the second identifier is used to identify the first device.

The transceiver module 142 is configured to send the scrambled data.

Optionally, in a possible implementation of this embodiment of this application, the transceiver module 142 is further configured to receive configuration information from a second device, where the configuration information includes the first identifier.

Optionally, in an example, the configuration information further includes the second identifier.

Optionally, the second identifier is obtained from a cell-specific configuration message or a user group-specific configuration message from the second device.

Optionally, in another example, the configuration information further includes transmission parameter configuration information corresponding to the second identifier, and the transmission parameter configuration information includes configuration information of a time-frequency resource and/or configuration information of a reference signal.

That the transceiver module 142 is configured to send the scrambled data is specifically:

the transceiver module 142 is configured to send the scrambled data based on the transmission parameter configuration information corresponding to the second identifier.

Optionally, in still another example, that the transceiver module 142 is configured to send the scrambled data is specifically:

the transceiver module 142 is configured to determine, based on the second identifier and a preset correspondence, transmission parameter configuration information corresponding to the second identifier, and send the scrambled data based on the transmission parameter configuration information corresponding to the second identifier.

The correspondence is a correspondence between the identifier used to scramble the coded data and the transmission parameter configuration information, and the transmission parameter configuration information includes configuration information of a time-frequency resource and/or configuration information of a reference signal.

Optionally, in the foregoing possible implementation of this embodiment of this application, the configuration information further includes transmission parameter configuration information, and the transmission parameter configuration information includes configuration information of a time-frequency resource and/or configuration information of a reference signal.

The processing module 141 is further configured to determine the second identifier based on the transmission parameter configuration information.

That the transceiver module 142 is configured to send the scrambled data is specifically:

the transceiver module 142 is configured to send the scrambled data based on the transmission parameter configuration information.

Optionally, the transmission parameter configuration information in the configuration information is obtained from a cell-configuration message or a user group-specific configuration message.

Optionally, in another possible implementation of this embodiment of this application, that the processing module 142 is configured to scramble the checked data based on a first identifier to obtain scrambled checked data is specifically:

the processing module 142 is configured to: generate a scrambling sequence based on the first identifier, where a length of the scrambling sequence is greater than a sequence length of the first identifier; and scramble the checked data by using the scrambling sequence to obtain scrambled checked data.

The data transmission apparatus in this embodiment may be configured to execute the implementation solutions of the method embodiments shown in FIG. 3, FIG. 4, FIG. 7, and FIG. 9. Specific implementations and technical effects are similar, and details are not described herein again.

Figure 15:
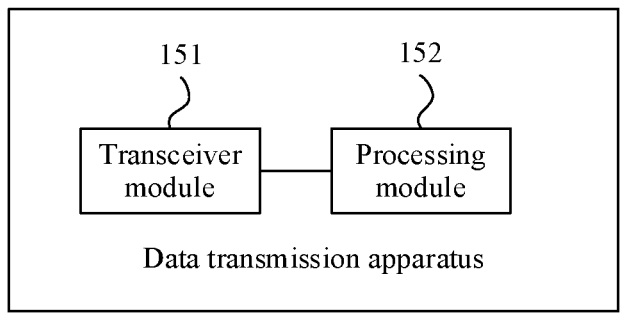
FIG. 15 is a schematic structural diagram of Embodiment 2 of a data transmission apparatus according to an embodiment of this application.

FIG. 15 is a schematic structural diagram of Embodiment 2 of a data transmission apparatus according to an embodiment of this application. The data transmission apparatus is applicable to a second device. In other words, the apparatus may be integrated into the second device, or may be the second device. For example, the second device may be a network device, or may be a terminal device. Optionally, as shown in FIG. 15, the apparatus may include a transceiver module 151 and a processing module 152.

The transceiver module 151 is configured to receive transmitted data from a first device.

The processing module 152 is configured to: descramble the transmitted data based on a second identifier to obtain descrambled transmitted data, perform channel decoding on the descrambled transmitted data to obtain decoded data, and perform cyclic redundancy check CRC on the decoded data to obtain checked data; and determine, based on the checked data, whether the decoded data is correct, and determine a first identifier of the first device, where a combination of the first identifier and the second identifier is used to identify the first device.

Optionally, in a possible implementation of this embodiment of this application, the transceiver module 151 is further configured to send configuration information to the first device, where the configuration information includes the first identifier.

Optionally, in an example, the configuration information further includes the second identifier.

Optionally, the second identifier in the configuration information is carried in a cell-specific configuration message or a user group-specific configuration message sent by the second device.

Optionally, in another example, the configuration information further includes transmission parameter configuration information corresponding to the second identifier, and the transmission parameter configuration information includes configuration information of a time-frequency resource and/or configuration information of a reference signal.

That the transceiver module 151 is configured to receive transmitted data from a first device is specifically:

the transceiver module 151 is configured to receive the transmitted data based on the transmission parameter configuration information corresponding to the second identifier.

Optionally, in still another example, that the transceiver module 151 is configured to receive transmitted data from a first device is specifically:

the transceiver module 151 is configured to: determine, based on the second identifier and a preset correspondence, transmission parameter configuration information corresponding to the second identifier, and receive the transmitted data based on the transmission parameter configuration information corresponding to the second identifier, where the correspondence is a correspondence between the identifier used to descramble the transmitted data and the transmission parameter configuration information, and the transmission parameter configuration information includes configuration information of a time-frequency resource and/or configuration information of a reference signal.

Optionally, in the foregoing possible implementation of this embodiment of this application, the configuration information further includes transmission parameter configuration information, and the transmission parameter configuration information includes configuration information of a time-frequency resource and/or configuration information of a reference signal.

The processing module 152 is further configured to determine the second identifier based on the transmission parameter configuration information.

Correspondingly, that the transceiver module 151 is configured to receive transmitted data from a first device is specifically:

the transceiver module 151 is configured to receive the transmitted data based on the transmission parameter configuration information.

Optionally, the transmission parameter configuration information in the configuration information is carried in a cell-specific configuration message or a user group-specific configuration message sent by the second device.

Optionally, in another possible implementation of this embodiment of this application, that the processing module 152 is configured to determine, based on the checked data, whether the decoded data is correct, and determine a first identifier of the first device is specifically:

the processing module 152 is configured to: determine whether the checked data is an identifier of a first device in a device group corresponding to the second identifier or a scrambling sequence corresponding to an identifier of a first device; and if the checked data is an identifier of a first device in the device group corresponding to the second identifier or a scrambling sequence corresponding to an identifier of a first device, determine that the decoded data is correct, and determine the first identifier of the first device; otherwise, determine that the decoded data is incorrect.

The data transmission apparatus in this embodiment may be configured to execute the implementation solutions of the method embodiments shown in FIG. 12 and FIG. 13. Specific implementations and technical effects are similar, and details are not described herein again.

It should be understood that division of the modules of the apparatus is merely division of logical functions. During actual implementation, all or some of the modules may be integrated into a physical entity, or may be physically separated. Moreover, these modules may be all implemented in a form of software invoked by a processing element, or may be all implemented in a form of hardware, or some modules may be implemented in a form of software invoked by a processing element, and some modules may be implemented in a form of hardware. For example, during implementation, the processing module may be a processing element separately disposed, or may be integrated into a chip of the apparatus. Alternatively, the processing module may be stored in a memory of the apparatus as program code that is invoked by a processing element of the apparatus to perform a function of the processing module. Implementation of another module is similar thereto. In addition, all or some of these modules may be integrated, or may be separately implemented. The processing element herein may be an integrated circuit and has a signal processing capability. In an implementation process, steps in the foregoing methods or the foregoing modules can be implemented by using a hardware integrated logical circuit in the processing element, or by using instructions in a form of software.

For example, these modules may be one or more integrated circuits configured to implement the foregoing methods, for example, one or more application-specific integrated circuits (ASIC), one or more microprocessors (digital signal processor, DSP), or one or more field programmable gate arrays (FPGA). For another example, when one of the modules is implemented in a form of invoking program code by a processing element, the processing element may be a general-purpose processor, for example, a central processing unit (CPU) or another processor that can invoke program code. For another example, these modules may be integrated, and implemented in a system-on-a-chip (SOC) form.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a readable storage medium or may be transmitted from a readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

Figure 16:
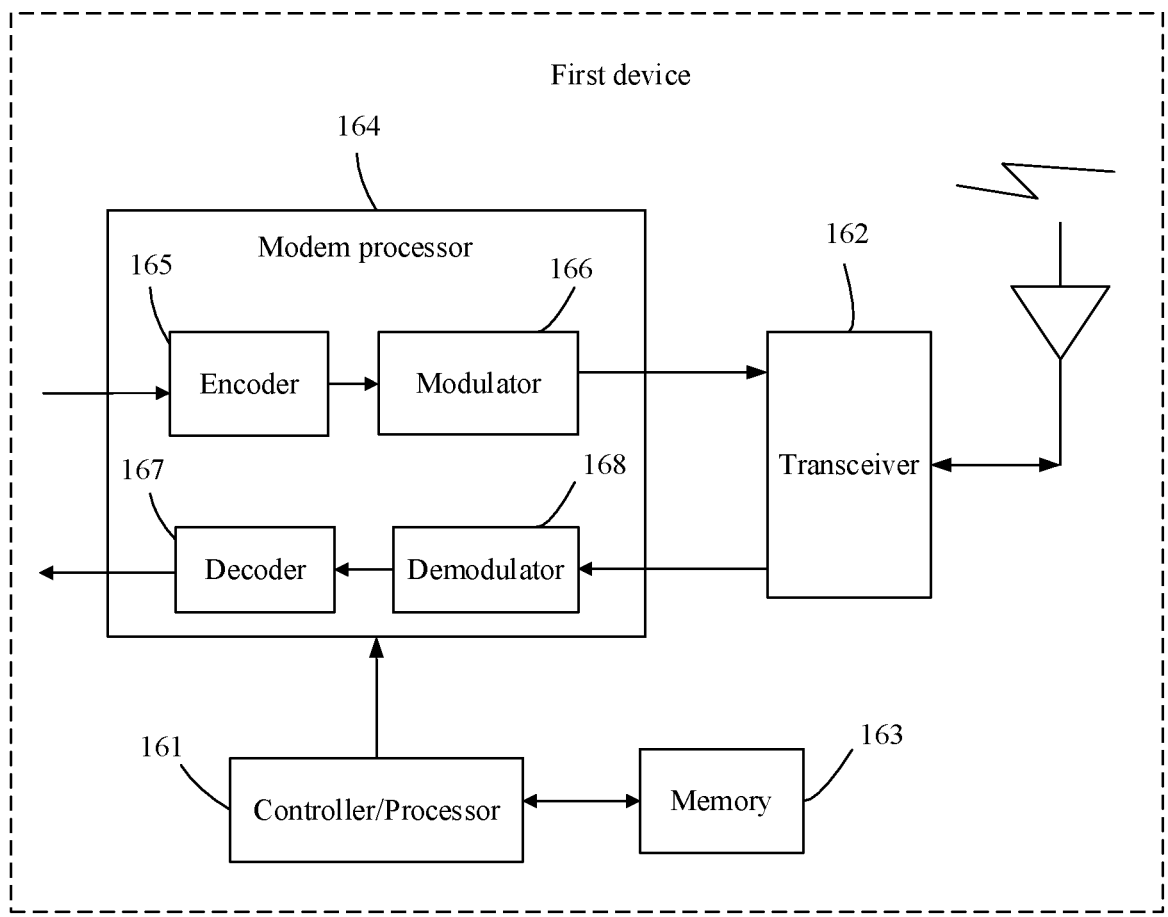
FIG. 16 is a simplified schematic diagram of a possible design structure of the first device in the foregoing embodiments.

FIG. 16 is a simplified schematic diagram of a possible design structure of the first device in the foregoing embodiments. As shown in FIG. 16, the first device may include a controller/processor 161, a transceiver 162, and a memory 163.

In this embodiment of this application, the controller/processor 161 may control and manage an action of the first device, and is configured to perform the steps in the embodiments shown in FIG. 3, FIG. 4, FIG. 7, and FIG. 9, and/or another process of the technology described in this application.

For example, the controller/processor 161 is configured to perform operation processes such as performing cyclic redundancy check CRC on to-be-transmitted data to obtain checked data, scrambling the checked data based on a first identifier to obtain scrambled checked data, performing channel coding on the to-be-transmitted data and the scrambled checked data to obtain coded data, and scrambling the coded data based on a second identifier to obtain scrambled data, where a combination of the first identifier and the second identifier is used to identify the first device.

For example, the controller/processor 161 is configured to support the first device in performing the steps in the embodiments shown in FIG. 3, FIG. 4, FIG. 7, and FIG. 9.

The transceiver 162 may be configured to send the scrambled data to a second device by using an antenna. Optionally, the transceiver 162 may be further configured to receive configuration information that is sent by the second device by using an antenna. The transceiver 162 may alternatively be implemented by a transmitter and a receiver with independent functions. Both may be implemented in a form of an antenna or the like. This is not limited in this embodiment of this application.

The memory 163 is configured to store program code and data that are used by the first device. For example, the memory 163 may be configured to store the scrambled data that is sent by the transceiver 162 to the second device by using a configuration instruction, and store an execution instruction and an execution result of the controller/processor 161.

For example, as shown in FIG. 16, the apparatus in this embodiment may further include a modem processor 164. In this case, the steps performed by the controller/processor 161 in the embodiments shown in FIG. 3, FIG. 4, FIG. 7, and FIG. 9 may be performed by the modem processor 164.

For example, in the modem processor 164, a coder 165 may be configured to receive to-be-transmitted data to be sent on an uplink, and process (for example, perform CRC, formatting, coding, and interleaving on) the to-be-transmitted data. A modulator 166 is configured to further process (for example, perform symbol mapping and modulation on) the coded to-be-transmitted data. A demodulator 167 is configured to process (for example, demodulate) a downlink signal received from the second device. A decoder 168 is configured to further process (for example, de-interleave and decode) the downlink signal. The coder 165, the modulator 166, the demodulator 167, and the decoder 168 may be implemented by using the integrated modem processor 164. These units perform processing based on a radio access technology (for example, access technologies of LTE and another evolved system) used by a radio access network.

The first device in this embodiment may be configured to execute the implementation solutions of the embodiments shown in FIG. 3, FIG. 4, FIG. 7, and FIG. 9. Specific implementations and technical effects are similar, and details are not described herein again.

Figure 17:
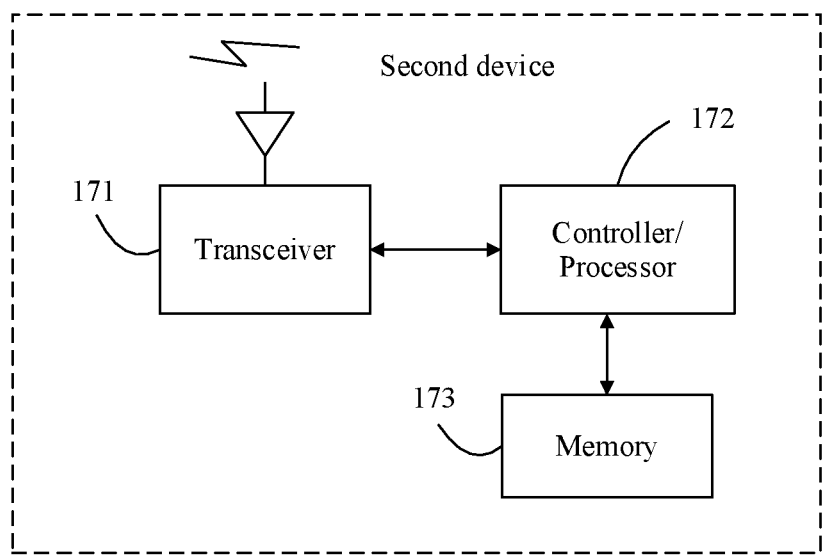
FIG. 17 is a simplified schematic diagram of a possible design structure of the second device in the foregoing embodiments.

FIG. 17 is a simplified schematic diagram of a possible design structure of the second device in the foregoing embodiments. As shown in FIG. 17, the second device may include a transceiver 171, a controller/processor 172, and a memory 173.

In this embodiment of this application, the transceiver 171 is configured to receive transmitted data from a first device by using an antenna. Optionally, the transceiver 171 may be further configured to send configuration information to the first device. Similarly, the transceiver 171 may be implemented by a transmitter and a receiver with independent functions. Both may be implemented in a form of an antenna or the like. This is not limited in this embodiment of this application.

The controller/processor 172 is configured to control and manage an action of the second device, and perform various functions to support a communications service of the second device. For example, the controller/processor 172 is configured to support the second device in performing the steps in the embodiments shown in FIG. 12 and FIG. 13, and/or another process of the technology described in this application.

For example, the controller/processor 172 is configured to: descramble the transmitted data based on a second identifier to obtain descrambled transmitted data, perform channel decoding on the descrambled transmitted data to obtain decoded data, and perform cyclic redundancy check CRC on the decoded data to obtain checked data; and determine, based on the checked data, whether the decoded data is correct, and determine a first identifier of the first device, where a combination of the first identifier and the second identifier is used to identify the first device.

The memory 173 is configured to store program code and data that are used by the second device. For example, the memory 173 may be configured to store the decoded date obtained through processing by the controller/processor 172, and store an execution instruction and an execution result of the controller/processor 172.

It should be noted that the second device is similar to the first device, and the second device may also include a modem processor. In this embodiment, the steps performed by the controller/processor 172 in the embodiments shown in FIG. 12 and FIG. 13 may be performed by the modem processor. Details are not described herein again.

For example, the controller/processor configured to perform functions of the first device or the second device in the embodiments of this application may be a CPU, a general-purpose processor, a DSP, an ASIC, a FPGA or another programmable logic device, a transistor logic device, a hardware component, or any combination thereof, which may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor.

The second device in this embodiment may be configured to execute the implementation solutions of the method embodiments shown in FIG. 12 and FIG. 13. Specific implementations and technical effects are similar, and details are not described herein again.

For example, an embodiment of this application further provides a storage medium. The storage medium stores an instruction. When the instruction is run on a computer, the computer is enabled to perform the methods in the embodiments shown in FIG. 3, FIG. 4, FIG. 7, and FIG. 9, or the methods in the embodiments shown in FIG. 12 and FIG. 13.

For example, an embodiment of this application further provides a chip running an instruction. The chip is configured to perform the methods in the embodiments shown in FIG. 3, FIG. 4, FIG. 7, and FIG. 9, or the methods in the embodiments shown in FIG. 12 and FIG. 13.

For example, an embodiment of this application further provides a computer program product including an instruction. When the instruction is run on a computer, the computer is enabled to perform the methods in the embodiments shown in FIG. 3, FIG. 4, FIG. 7, and FIG. 9, or the methods in the embodiments shown in FIG. 12 and FIG. 13.

In this application, "at least one" refers to one or more, and "a plurality of" refers to two or more. The term "and/or" describes an association relationship between associated objects and represents that three relationships may exist. For example, A and/or B may represent the following three cases: Only A exists, both A and B exist, and only B exists, where A and B may be singular or plural. The character "/" indicates that a relationship between associated objects is "or". In a formula, the character "/" indicates that a relationship between associated objects is "division". The expression "at least one of the following items" or a similar expression means any combination of these items, including a single item or any combination of a plurality of items. For example, at least one of a, b, or c may represent a, b, c, a-b, a-c, b-c, or a-b-c, where a, b, and c may be one or more in quantity.

It may be understood that the numbers in the embodiments of this application are merely for differentiation for ease of description, and are not intended to limit the scope of the embodiments of this application.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

What is claimed is:

1. A data transmission method, applicable to a first device, and comprising:
   performing a cyclic redundancy check (CRC) on to-be-transmitted data to obtain checked data;
   scrambling the checked data based on a first identifier to obtain scrambled checked data;
   performing channel coding on the scrambled checked data to obtain coded data;

scrambling the coded data based on a second identifier to obtain scrambled coded data, wherein a combination of the first identifier and the second identifier is used to identify the first device; and sending the scrambled coded data.

2. The method according to claim 1, wherein the method further comprises:

receiving configuration information from a second device, wherein the configuration information comprises the first identifier.

3. The method according to claim 2, wherein the configuration information further comprises the second identifier.

4. The method according to claim 3, wherein the configuration information further comprises a cell-specific configuration message or a user group-specific configuration message including the second identifier.

5. The method according to claim 3, wherein the configuration information further comprises transmission parameter configuration information corresponding to the second identifier, and the transmission parameter configuration information comprises configuration information of a time-frequency resource and/or configuration information of a reference signal; and sending the scrambled coded data comprises:

sending the scrambled coded data based on the transmission parameter configuration information corresponding to the second identifier.

6. The method according to claim 3, wherein the sending the scrambled coded data comprises:

determining, based on the second identifier and a preset correspondence, transmission parameter configuration information corresponding to the second identifier, the correspondence being between an identifier used to scramble the coded data and the transmission parameter configuration information, and the transmission parameter configuration information comprises configuration information of a time-frequency resource and/or configuration information of a reference signal; and sending the scrambled coded data based on the transmission parameter configuration information corresponding to the second identifier.

7. The method according to claim 2, wherein the configuration information further comprises transmission parameter configuration information, and the transmission parameter configuration information comprises configuration information of a time-frequency resource and/or configuration information of a reference signal; and the method further comprises:

determining the second identifier based on the transmission parameter configuration information; and sending the scrambled coded data comprises:

sending the scrambled coded data based on the transmission parameter configuration information.

8. The method according to claim 7, wherein the transmission parameter configuration information is obtained from a cell-specific configuration message or a user group-specific configuration message.

9. The method according to claim 1, wherein scrambling the checked data based on the first identifier to obtain scrambled checked data comprises:

generating a scrambling sequence based on the first identifier, wherein a length of the scrambling sequence is greater than a sequence length of the first identifier; and scrambling the checked data by using the scrambling sequence to obtain the scrambled checked data.

10. A data transmission apparatus, applicable to a first device, and comprising a processing module and a transceiver module, wherein the processing module is configured to: perform a cyclic redundancy check CRC on to-be-transmitted data to obtain checked data; scramble the checked data based on a first identifier to obtain scrambled checked data; perform channel coding on the to-be-transmitted data and the scrambled checked data to obtain coded data; and scramble the coded data based on a second identifier to obtain scrambled coded data, wherein a combination of the first identifier and the second identifier is used to identify the first device; and the transceiver module is configured to send the scrambled coded data.

11. The apparatus according to claim 10, wherein the transceiver module is further configured to receive configuration information from a second device, and the configuration information comprises the first identifier.

12. The apparatus according to claim 11, wherein the configuration information further comprises the second identifier.

13. The apparatus according to claim 12, wherein the configuration information further comprises a cell-specific configuration message or a user group-specific configuration message and the second identifier is obtained from the cell-specific configuration message or the user group-specific configuration message.

14. The apparatus according to claim 12, wherein the configuration information further comprises transmission parameter configuration information corresponding to the second identifier, and the transmission parameter configuration information comprises configuration information of a time-frequency resource and/or configuration information of a reference signal; and the transceiver module is further configured to send the scrambled coded data based on the transmission parameter configuration information corresponding to the second identifier.

15. The apparatus according to claim 12, wherein the transceiver module is further configured to: determine, based on the second identifier and a preset correspondence, transmission parameter configuration information corresponding to the second identifier; and send the scrambled coded data based on the transmission parameter configuration information corresponding to the second identifier, the correspondence being between an identifier used to scramble the coded data and the transmission parameter configuration information, and the transmission parameter configuration information comprises configuration information of a time-frequency resource and/or configuration information of a reference signal.

16. The apparatus according to claim 11, wherein the configuration information further comprises transmission parameter configuration information, and the transmission parameter configuration information comprises configuration information of a time-frequency resource and/or configuration information of a reference signal;

the processing module is further configured to determine the second identifier based on the transmission parameter configuration information; and the transceiver module is configured to send the scrambled coded data based on the transmission parameter configuration information.

17. The apparatus according to claim 16, wherein the transmission parameter configuration information is obtained from a cell-specific configuration message or a user group-specific configuration message.

18. The apparatus according to claim 10, wherein the processing module is further configured to: generate a scrambling sequence based on the first identifier, wherein a length of the scrambling sequence is greater than a sequence length of the first identifier; and scramble the checked data by using the scrambling sequence to obtain the scrambled checked data.

19. A data transmission apparatus, applicable to a second device, and
  comprising a transceiver module and a processing module, wherein
  the transceiver module is configured to receive transmitted data from a first device; and
  the processing module is configured to: descramble the transmitted data based on a second identifier to obtain descrambled transmitted data; perform channel decoding on the descrambled transmitted data to obtain decoded data; perform a cyclic redundancy check CRC on the decoded data to obtain checked data; determine, based on the checked data, whether the decoded data is correct; and determine a first identifier of the first device, wherein a combination of the first identifier and the second identifier is used to identify the first device.

* * * * *

UNITED STATES PATENT AND TRADEMARK OFFICE
CERTIFICATE OF CORRECTION

PATENT NO. : 11,381,340 B2  
APPLICATION NO. : 17/212263  
DATED : July 5, 2022  
INVENTOR(S) : Yiqun Wu et al.

Page 1 of 1

It is certified that error appears in the above-identified patent and that said Letters Patent is hereby corrected as shown below:

On the Title Page

Item (56), Column 2, Line 1, delete "Rusch-Lhwe" and insert -- Rusch-Ihwe --.

Item (56), Column 2, Line 1, delete "al.." and insert -- al., --.

Item (57), Column 2, Line 3, delete "After" and insert -- after --.

In the Claims

Column 32, Line 6, Claim 10, delete "CRC" and insert -- (CRC) --.

Column 33, Line 22, Claim 19, delete "CRC" and insert -- (CRC) --.

Signed and Sealed this  
Sixth Day of September, 2022

Katherine Kelly Vidal  
*Director of the United States Patent and Trademark Office*